US009746562B2

(12) United States Patent
Friedman et al.

(10) Patent No.: US 9,746,562 B2
(45) Date of Patent: Aug. 29, 2017

(54) PORTABLE GROUND BASED AUGMENTATION SYSTEM

(71) Applicant: The Boeing Company, Chicago, IL (US)

(72) Inventors: Roger E. Friedman, Carnation, WA (US); Janet Suzanne Booth, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 535 days.

(21) Appl. No.: 14/319,363

(22) Filed: Jun. 30, 2014

(65) Prior Publication Data

US 2015/0378028 A1    Dec. 31, 2015

(51) Int. Cl.
*G01S 19/08* (2010.01)
*G01S 19/39* (2010.01)
*H04W 4/12* (2009.01)

(52) U.S. Cl.
CPC .............. *G01S 19/08* (2013.01); *G01S 19/39* (2013.01); *H04W 4/12* (2013.01)

(58) Field of Classification Search
CPC ...................................................... G01S 19/08
See application file for complete search history.

(56) References Cited

U.S. PATENT DOCUMENTS

| 5,596,328 A | 1/1997 | Stangeland |
| 5,600,329 A | 2/1997 | Brenner |
| 5,702,070 A * | 12/1997 | Waid ..................... G01S 5/0045 244/183 |
| 5,786,773 A | 7/1998 | Murphy |
| 5,995,043 A | 11/1999 | Murphy |
| 6,023,239 A | 2/2000 | Kovach |
| 6,138,074 A * | 10/2000 | Gower ..................... G01S 19/07 342/357.21 |
| 6,549,829 B1 | 4/2003 | Anderson et al. |
| 6,674,398 B2 | 1/2004 | Murphy |
| 6,760,663 B2 | 7/2004 | Brenner |
| 6,801,158 B2 | 10/2004 | Snodgrass et al. |
| 6,809,683 B2 * | 10/2004 | Strangeland ............ G01S 19/08 342/357.29 |
| 6,950,036 B2 | 9/2005 | Snodgrass et al. |
| 6,963,304 B2 | 11/2005 | Murphy |
| 7,362,262 B2 | 4/2008 | Murphy |

(Continued)

FOREIGN PATENT DOCUMENTS

| CN | 102713672 A | 10/2012 |
| TW | 201140117 A | 11/2011 |

OTHER PUBLICATIONS

Canadian Intellectual Property Office Office Action, dated Jul. 13, 2016, regarding Application No. 2,892,462, 6 Pages.

(Continued)

*Primary Examiner* — Gregory C Issing
(74) *Attorney, Agent, or Firm* — Yee & Associates, P.C.

(57) ABSTRACT

A method and apparatus of generating navigation information for an aircraft. Satellite signals are received at a group of reference receivers at a group of locations. A level of accuracy is identified for the group of reference receivers based on satellite data formed from the satellite signals. It is indicated when the group of locations of the group of reference receivers does not meet a desired level of accuracy. Messages are generated using the navigation information from the satellite data when the group of reference receivers has the desired level of accuracy.

21 Claims, 14 Drawing Sheets

(56) References Cited

U.S. PATENT DOCUMENTS

| | | | |
|---|---|---|---|
| 7,373,223 | B2 | 5/2008 | Murphy |
| 7,400,294 | B2 * | 7/2008 | Whitehead ............ G01S 19/07 342/357.24 |
| 7,414,573 | B2 | 8/2008 | Murphy |
| 7,970,503 | B2 | 6/2011 | Lapp et al. |
| 8,072,375 | B2 * | 12/2011 | Trautenberg ............ G01S 19/02 342/357.395 |
| 8,494,693 | B2 | 7/2013 | Murphy |
| 8,630,756 | B2 | 1/2014 | Fleiger-Holmes et al. |
| 2006/0158372 | A1 * | 7/2006 | Heine .................... G01S 19/07 342/357.31 |
| 2008/0007452 | A1 * | 1/2008 | Damidaux ............. G01S 19/08 342/357.45 |
| 2008/0255715 | A1 | 10/2008 | Elchynski |
| 2011/0181465 | A1 | 7/2011 | Li et al. |
| 2011/0231038 | A1 * | 9/2011 | Studenny ............... B64D 45/04 701/17 |

OTHER PUBLICATIONS

Intellectual Property Office of Singapore Search Report, dated Nov. 18 2015, regarding Application No. 10201505080T, 7 pages.
Extended European Search Report, dated Nov. 23, 2015, regarding Application No. EP15174647.6, 13 pages.
Braff, Ronald, "Description of the FAA's Local Area Augmentation System (LAAS)", Navigation, Institute of Navigation, Fairfax, Virginia, vol. 44, No. 4, Mar. 1, 1998, pp. 411-424.
Circiu et al., "Evaluation of Dual Frequency Gbas Performance using Flight Data," ITM 2014—Proceedings of the 2014 International Technical Meeting of the Institute of Navigation, Manassas, VA, Jan. 29, 2014, pp. 645-656.
Taiwan Intellectual Property Office Search Report, dated Dec. 8, 2016, regarding Application No. 104115001, 17 pages.
Extended European Search Report, dated Nov. 23, 2016, regarding Application No. EP15174641.6, 6 pages.

* cited by examiner

PORTABLE GROUND BASED AUGMENTATION SYSTEM

BACKGROUND INFORMATION

1. Field

The present disclosure relates generally to aircraft and, in particular, to providing navigation information to aircraft. Still more particularly, the present disclosure relates to a method and apparatus for sending navigation information to an aircraft to guide the aircraft to a landing site.

2. Background

When an aircraft approaches an airport, navigation information may be received from one or more systems to aid in guiding the aircraft. For example, an instrument landing system (ILS), a microwave landing system (MLS), a global positioning satellite (GPS) system, and other types of systems may be used to provide navigation information to the aircraft for use in guiding the aircraft to a runway.

Augmentation systems on the ground at airports provide information that may be used by the aircraft to increase the accuracy of the global navigation satellite system (GNSS) receiver in the aircraft. The satellites transmit signals processed by these augmentation systems.

These types of augmentation systems transmit correction information for measured satellite pseudo-ranges. The corrections are difference-calculated ranges indicated by the satellites and the known fixed positions. These systems are in a reference position that has been very accurately surveyed.

The receiver in the reference position receives a global navigation satellite system (GNSS) signal and uses the expected ranges derived from the known position to calculate ranging corrections. The augmentation system receives pseudo-ranges from receivers and compares that with expected pseudo-ranges with the difference being an error correction. The process of generating the information is often referred to as augmentation and the error or corrections are also referred to as pseudo-range correction data.

The augmentation system then transmits this pseudo-range correction data to the global navigation satellite system receiver in the aircraft for use in correcting measurements made by the system in the aircraft. This pseudo-range correction data is used by the aircraft to obtain a more accurate location of the aircraft.

Many of these augmentation systems at airports are permanent ground installations with the antennas for receiving signals from the satellites in pre-surveyed locations. In some cases, portability is desired to allow for temporary use at an airport or other location with a runway or landing strip where aircraft may land.

Some augmentation systems that provide pseudo-range correction data are portable and can be moved from one location to another. These currently used portable augmentation systems, however, take an amount of time to set up and become operational that is often longer than desired. The size and complexity of the equipment in the currently used portable augmentation systems causes the time and effort needed to set up the system to be longer than desired. With the complexity of these systems, often times specialized training is needed by human operators to operate and set up currently used portable augmentation systems.

Also, the locations for antennas are identified and set up from surveys of the location made ahead of time. This process is the same as one performed for permanent installations of these systems and also adds to the time needed to set up an augmentation system. As a result, time is needed to perform and obtain a survey for placement of the antennas in the receivers. As a result, setting up currently used portable augmentation systems does not occur as quickly as desired in many cases. For example, a situation may occur in which an aircraft may be diverted to another location for landing in which an augmentation system is not available. In this situation, pseudo-range correction data for the aircraft may not be available as soon as desired depending on the amount of time available to set up a currently used portable augmentation system before information is needed by the aircraft.

As a result, the portability and ease at setting up and using currently used portable augmentation systems are not as great as desired. Therefore, it would be desirable to have a method and apparatus that takes into account at least some of the issues discussed above, as well as other possible issues.

SUMMARY

In one illustrative embodiment, a portable augmentation system comprises a group of reference receivers and a navigation information generator. The group of reference receivers receives satellite signals and identifies raw pseudo-range data and satellite data parameters from the satellite signals. The raw pseudo-range data and the satellite data parameters form satellite data. The navigation information generator receives the satellite data from the group of reference receivers and identifies a level of accuracy for the group of reference receivers based on the satellite data. Further, the navigation information generator indicates when a group of locations of the group of reference receivers does not meet a desired level of accuracy. Still further, the navigation information generator generates messages using navigation information from the satellite data when the group of reference receivers has the desired level of accuracy.

In another illustrative embodiment, a method of generating navigation information for an aircraft is presented. Satellite signals are received at a group of reference receivers at a group of locations. A level of accuracy is identified for the group of reference receivers based on satellite data formed from the satellite signals. It is indicated when the group of locations of the group of reference receivers does not meet a desired level of accuracy. Messages are generated using the navigation information from the satellite data when the group of reference receivers has the desired level of accuracy.

In yet another illustrative embodiment, an apparatus comprises a group of reference receivers, a transmitter system, and a navigation information generator. The group of reference receivers receives satellite signals and identifies raw pseudo-range data and a group of satellite data parameters in the satellite signals. The raw pseudo-range data and the group of satellite data parameters form satellite data. The transmitter system transmits messages to an aircraft. The navigation information generator has a satellite data processor that receives the satellite data from the group of reference receivers. The navigation information generator also generates the messages with navigation information from the satellite data and configuration data. The navigation information generator sends the messages to the aircraft over the transmitter system. Further, the navigation information generator includes an operation application that controls operation of the group of reference receivers, the transmitter system, and the navigation information generator. Still further, the navigation information generator includes a configuration application that receives user input to access configuration data used by the satellite data processor to generate the messages. Even further, the navigation information generator includes a configuration database for the configuration data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the design of currently available augmentation systems are not as portable as desired and take more time to set up than desired. For example, currently available systems may be transported using trucks and are not portable by a single human operator.

Also, the illustrative embodiments recognize and take into account that the currently used portable augmentation systems lack a user interface that allows for managing the portable augmentation system. For example, an interface that provides a desired amount of interaction by a human operator to set up and configure the portable augmentation system at the location or in some other location is currently unavailable.

As another example, the illustrative embodiments recognize and take into account that finding positions for the receivers currently involves surveying the location ahead of time to obtain a position that is precise for calculating the pseudo-range correction data. This process is more time consuming than desired.

Thus, the illustrative embodiments provide a method and apparatus for generating navigation information for an aircraft. For example, an apparatus comprises a group of reference receivers at a group of locations that receives satellite signals. The apparatus identifies a level of accuracy for the group of reference receivers based on satellite data formed from the satellite signals. The apparatus then indicates when the group of locations of the group of reference receivers does not meet a desired level of accuracy.

Figure 1:
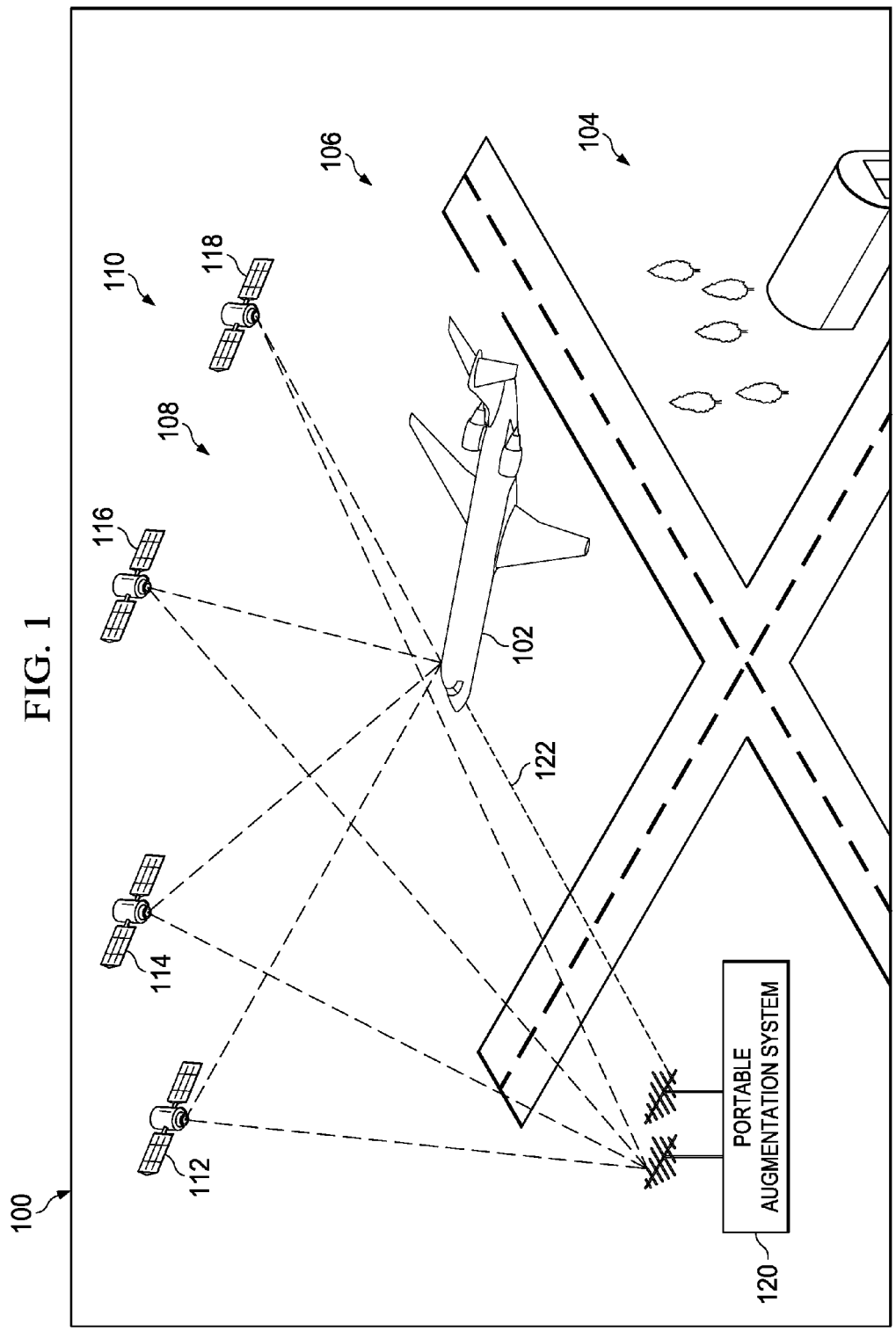
FIG. 1 is an illustration of an aircraft navigation environment in accordance with an illustrative embodiment.

With reference now to the figures, and in particular, with reference to FIG. 1, an illustration of an aircraft navigation environment is depicted in accordance with an illustrative embodiment. In this example, aircraft navigation environment 100 comprises aircraft 102. Aircraft 102 flies over surface of earth 104 and approaches airport 106.

Aircraft 102 has a global positioning system receiver. The aircraft receives signals 108 from satellites 110. In this example, satellites 110 include satellite 112, satellite, 114, satellite 116, and satellite 118.

The global positioning system receiver in aircraft 102 identifies a position of aircraft 102 using signals 108. The accuracy of the position identified by the reference receiver in aircraft 102 is not as precise as desired in this illustrative example.

In the illustrative example, portable augmentation system 120 generates navigation information that may be used by aircraft 102 to increase the accuracy in identifying the position of aircraft 102. For example, portable augmentation system 120 identifies pseudo-range correction data from signals 108. The pseudo-range correction data forms navigation information that is sent to aircraft 102 over signals 122. The navigation information may include other information used by aircraft 102 to operate at airport 106. For example, the navigation information may also include at least one of guidance information, runway information, or other suitable navigation information.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Aircraft 102 may increase the accuracy in identifying its position by receiving the pseudo-range correction data in the navigation information sent in signals 122 from portable augmentation system 120. The pseudo-range correction data in the navigation information is used by aircraft 102 to adjust the position that aircraft 102 identified from signals 108 such that the position is identified with increased accuracy. In other words, the pseudo-range correction data in the navigation information sent over signals 122 may be used to "augment" the position identified by aircraft 102.

In this illustrative example, portable augmentation system 120 has features that overcome technical problems present with other currently used portable augmentation systems that provide navigation information to aircraft 102. In one illustrative example, portable augmentation system 120 has a self-survey mechanism that allows portable augmentation system 120 to be set up and operated without a survey of the area being performed prior to the set up of portable augmentation system 120. In this manner, the time needed to make portable augmentation system 120 operational is reduced as compared to a portable augmentation system that uses a survey of a location for the portable augmentation system that is performed ahead of time.

Also, in another illustrative example, portable augmentation system 120 has increased ease of use by human operators setting and operating portable augmentation system 120. A user interface is provided with software modules in an architecture that increase the speed at which portable augmentation system 120 may be set up and operated by a human operator. With the user interface, changes in the configuration of portable augmentation system 120 may occur at the location of use more quickly and easily.

The illustration of aircraft navigation environment 100 in FIG. 1 is not meant to limit the manner in which other illustrative embodiments may be implemented. For example, the navigation information may be used during other times during the operation of aircraft 102 other than landing at airport 106. For example, correction information may be transmitted in the navigation information for use by aircraft 102 in following a flight plan while in a cruising phase of flight. As another example, satellites 110 may include other number of satellites, such as 5, 8, 24 or some other number of satellites.

Figure 2:
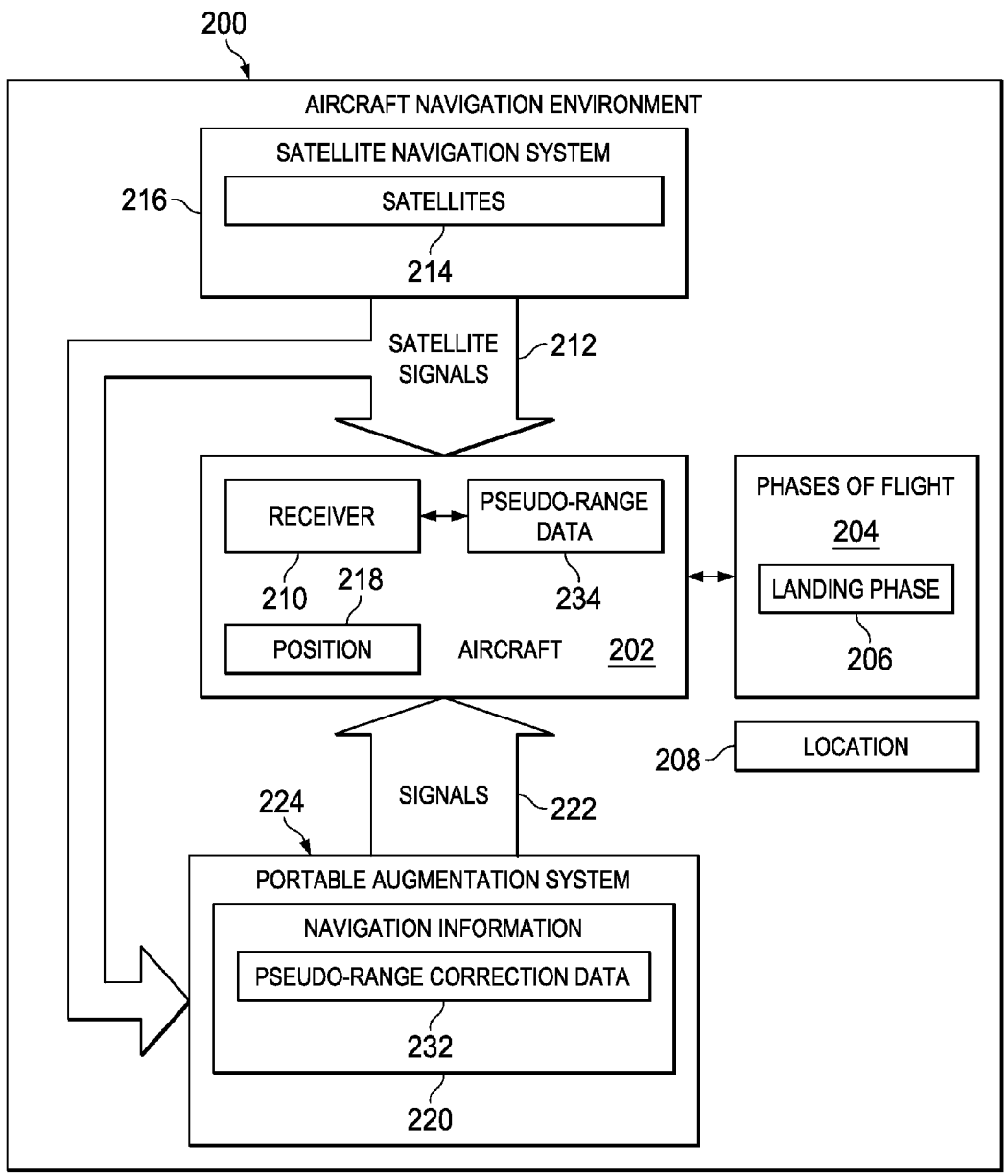
FIG. 2 is an illustration of a block diagram of an aircraft navigation environment in accordance with an illustrative embodiment.

Turning next to FIG. 2, an illustration of a block diagram of an aircraft navigation environment is depicted in accordance with an illustrative embodiment. Aircraft navigation environment 100 in FIG. 1 is an illustration of one physical implementation of aircraft navigation environment 200 shown in block form in this figure.

As depicted, aircraft 202 has phases of flight 204 while operating in aircraft navigation environment 200. In this illustrative example, aircraft 202 is in landing phase 206. In landing phase 206, aircraft 202 lands at location 208. Location 208 may be an airport, a runway on a field, an area of land, or some other suitable location.

In this illustrative example, aircraft 202 has receiver 210. Receiver 210 receives satellite signals 212 from satellites 214 in satellite navigation system 216.

As depicted, satellites 214 in satellite navigation system 216 send satellite signals 212 that allow receiver 210 to determine position 218 of receiver 210. Position 218 of receiver 210 is also position 218 of aircraft 102. Receiver 210 is at least one of a global navigation satellite system receiver, or other suitable type of receiver that determines position 218 of aircraft 102.

In the illustrative example, one or more groups of satellites 214 may be part of one or more global navigation satellite systems. These groups may be referred to as constellations. A group of satellites 214 may be a global navigation satellite system (GNSS). The groups of satellites 214 may be part of Global Positioning Satellite (GPS) System, Global Navigation Satellite System (GLONASS), or some other suitable satellite navigation system.

As depicted, receiver 210 identifies position 218 of aircraft 202 from satellite signals 212. Position 218 is a location of aircraft 202 in three-dimensional space. Position 218 may be described using longitude, latitude, and altitude. In some illustrative examples, position 218 also may include an orientation of aircraft 202.

In the illustrative example, position 218 identified by receiver 210 may not have a desired level of accuracy. The accuracy of position 218 of aircraft 202 may be increased with navigation information 220 sent to aircraft 202 over signals 222 from portable augmentation system 224.

Portable augmentation system 224 receives satellite signals 212 from satellites 214 and generates navigation information 220 using satellite signals 212. In particular, portable augmentation system 224 generates pseudo-range correction data 232 and sends this information in navigation information 220 to aircraft 202 over signals 222.

Aircraft 202 uses pseudo-range correction data 232 to correct pseudo-range data 234 identified by receiver 210 in aircraft 202. The correction results in identifying position 218 with a higher level of accuracy than without pseudo-range correction data 232. This type of correction may be referred to as an augmentation to pseudo-range data 234.

In the illustrative example, portable augmentation system 224 may be moved from a first location to a second location and set up more quickly as compared to other portable augmentation systems. With greater accuracy, increased safety and efficiency is present for operating aircraft. For example, increased accuracy allows for reduced separation distances between aircraft. In other words, more aircraft may operate the same airspace with a desired level of safety.

Figure 3:
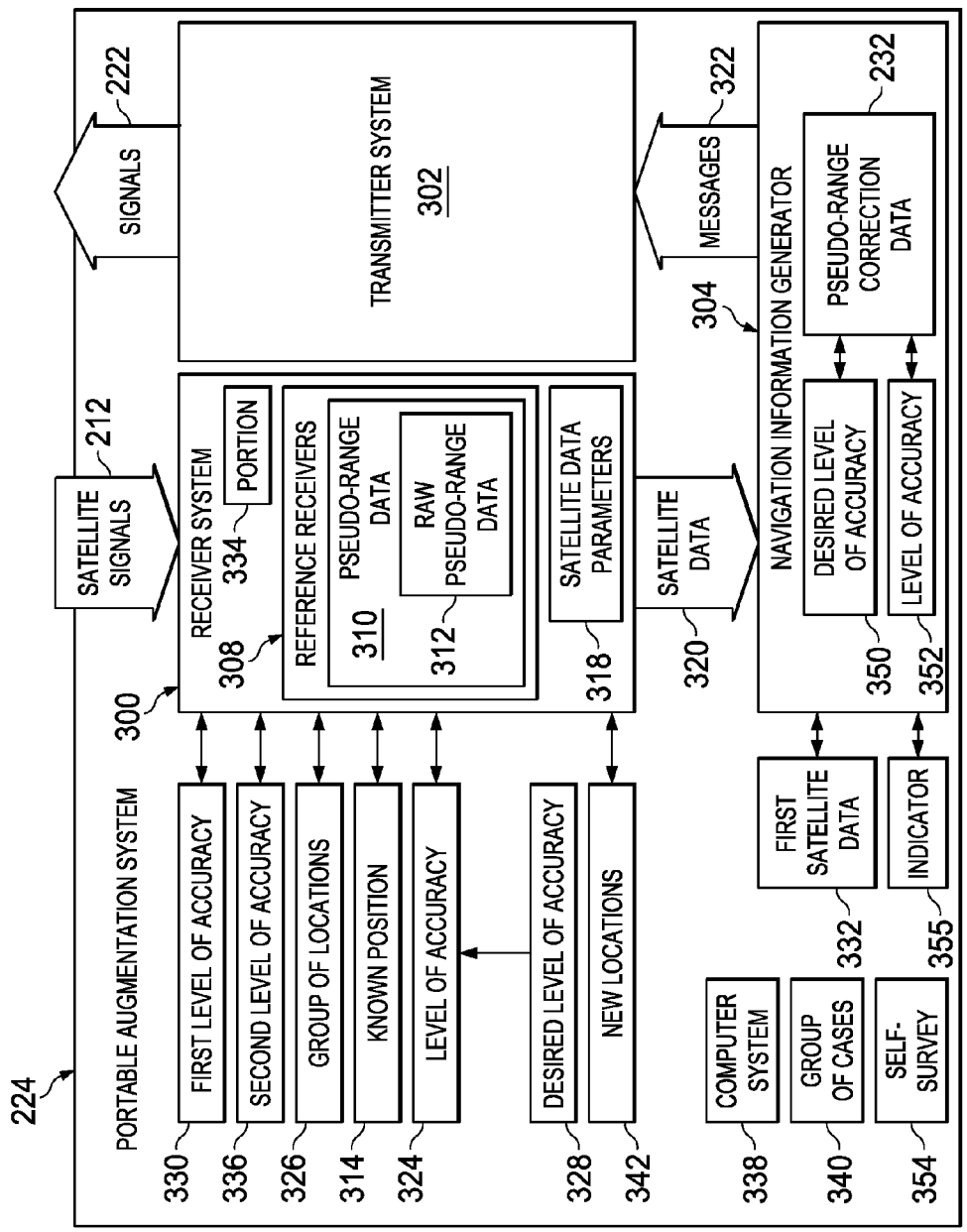
FIG. 3 is an illustration of a block diagram of a portable augmentation system in accordance with an illustrative embodiment.

With reference next to FIG. 3, an illustration of a block diagram of a portable augmentation system is depicted in accordance with an illustrative embodiment. In this illustrative example, components that may be found in portable augmentation system 224 are shown. As depicted, portable augmentation system 224 includes receiver system 300, transmitter system 302, and navigation information generator 304.

Receiver system 300 includes a group of reference receivers 308. The group of reference receivers 308 may be implemented using any hardware, software, or combination thereof that receives satellite signals 212 from satellites 214 and processes satellite signals 212.

As depicted, the group of reference receivers 308 may receive more than one frequency per satellite in satellites 214. Also, the group of reference receivers 308 may be configured to receive satellite signals 212 from a plurality of constellations of satellites 214.

A constellation of satellites 214 is a group of satellites working in concert. Such a constellation may be considered to be a plurality of satellites with coordinated ground coverage, operating together under shared control, and synchronized so that they overlap well in coverage and complement rather than interfere with the coverage of other satellites. For example, groups of satellites 214 such as Global Positioning Satellite (GPS) System, Global Navigation Satellite System (GLONASS), or other suitable satellite navigation systems are examples of constellations.

As used herein, a "group of," when used with reference to items means one or more items. For example, a group of reference receivers 308 means one or more reference receivers.

In this illustrative example, the group of reference receivers 308 receives satellite signals 212. The group of reference receivers 308 identifies pseudo-range data 310 and a group of satellite data parameters 318 from satellite signals 212 received by the group of reference receivers 308. Satellite data parameters 318 include at least one of satellite identification, satellite clock correction coefficients data, satellite position data, carrier waves, ranging codes, atmospheric error data, or other suitable types of data from a satellite for determining position information from satellite signals.

In this example, pseudo-range data 310 is raw pseudo-range data 312. Raw pseudo-range data 312 is data about pseudo-ranges identified from satellite signals 212 without including any corrections or changes.

Raw pseudo-range data 312 and the group of satellite data parameters 318 form satellite data 320 in this example. The group of reference receivers 308 send the satellite data to navigation information generator 304.

Based on raw pseudo-range data 312 and known position 314 of portable augmentation system 224, portable augmentation system 224 generates pseudo-range correction data 232 using satellite data 320 to form navigation information 220. In the illustrative example, navigation information generator 304 sends navigation information 220 in messages 322 over signals 222 to aircraft 202 over transmitter system 302. Signals 222 are radio frequency (RF) signals in this illustrative example.

As depicted, the accuracy of pseudo-range correction data 232 depends on the accuracy of known position 314 for the group of reference receivers 308. In these illustrative examples, known position 314 is currently based on performing a survey of the site where portable augmentation system 224 is to be set up. The survey includes human operators surveying a reference point such as that on a runway.

Then, an identification of the position for each reference receiver is made. All of the data collected during the surveys is then processed and entered into a data structure for use by portable augmentation system 224. The data structure may be selected from one of a file, a linked list, a table, a database, or some other suitable data structure.

With currently used augmentation systems, placing the group of reference receivers 308 in precise locations identified for these devices is important to obtaining desired level of accuracy 350 for pseudo-range correction data 232. An incorrect placement may result in an inability to obtain desired level of accuracy 350 for pseudo-range correction data 232.

In the illustrative example, the amount of time needed to set up portable augmentation system 224 is reduced as compared to currently available portable augmentation systems. In particular, the time needed to perform a survey of a site may be avoided or reduced in the illustrative example.

Navigation information generator 304 allows an identification of level of accuracy 352 of pseudo-range correction data 232 to be made prior to operating portable augmentation system 224. Navigation information generator 304 performs self-survey 354 to determine whether level of accuracy 324 for pseudo-range correction data 232 has desired level of accuracy 328. This determination is based on whether level of accuracy 324 has desired level of accuracy 328. For example, navigation information generator 304 receives satellite data 320 from the group of reference receivers 308 and identifies level of accuracy 324 for the group of reference receivers 308 based on satellite data 320.

Navigation information generator 304 generates indicator 355 identifying whether group of locations 326 of the group of reference receivers 308 meet desired level of accuracy 328. With an indication in indicator 355 that group of locations 326 of the group of reference receivers 308 does not meet desired level of accuracy 328, one or more of the group of reference receivers 308 may be moved to new locations 342 or removed from the group of reference receivers 308.

In an illustrative example, self-survey 354 may be performed when no prior survey for group of locations 326 is present. In this manner, the time and planning needed to perform surveys prior to deploying portable augmentation system 224 may be avoided.

Additionally, if a survey has been performed ahead of time, self-survey 354 may be performed to determine whether the survey provides a desired level of accuracy. Self-survey 354 may provide a verification of the accuracy of the prior survey.

The prior survey may identify group of locations 326. One or more of group of locations 326 may not provide a desired level of accuracy for a number of different reasons. For example, the survey may not have been accurate in identifying group of locations 326. As another example, a building, a sound barrier, or some other object may block one or more of the group of reference receivers 308 from receiving satellite signals 212 with a desired level of accuracy.

Thus, self-survey 354 may be used to verify a prior survey. In this manner, self-survey 354 may be used to ensure that a desired level of accuracy is achieved.

Navigation information generator 304 generates messages 322 using navigation information 220 from satellite data 320 when the group of reference receivers 308 have desired level of accuracy 328. Messages 322 may then be transmitted to aircraft 202 over transmitter system 302.

In one illustrative example, group of locations 326 is a first group of locations 326, level of accuracy 324 for the group of reference receivers 308 based on satellite data 320 is first level of accuracy 330 for the first group of locations 326 for the group of reference receivers 308. In this example, satellite data 320 is first satellite data 332.

In the example, subsequent to portion 334 of the group of reference receivers 308 being moved to a second group of locations 326 that is different than the first group of locations 326, navigation information generator 304 identifies second level of accuracy 336 for the group of reference receivers 308 based on a second satellite data 320 identified from satellite signals 212 by the group of reference receivers 308. In the illustrative examples, second level of accuracy 336 based on the second satellite data 320 may be identified subsequent to portion 334 of the group of reference receivers 308 being one or more of re-powered and re-configured.

As depicted, navigation information generator 304 may be implemented in software, hardware, firmware or a combination thereof. When software is used, the operations performed by navigation information generator 304 may be implemented in program code configured to run on a processor unit. When firmware is used, the operations performed by navigation information generator 304 may be implemented in program code and data and stored in persistent memory to run on a processor unit. When hardware is employed, the hardware may include circuits that operate to perform the operations in navigation information generator 304.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, navigation information generator 304 may be located in computer system 338. Computer system 338 is one or more computers. When more than one computer is present in computer system 338, those computers may be in communication with each other through a communications medium such as a network.

Further, increased portability may be provided for portable augmentation system 224 through group of cases 340 that are man portable. Group of cases 340 may hold the group of reference receivers 308, transmitter system 302 that transmits messages 322 to aircraft 202, and navigation information generator 304.

Figure 4:
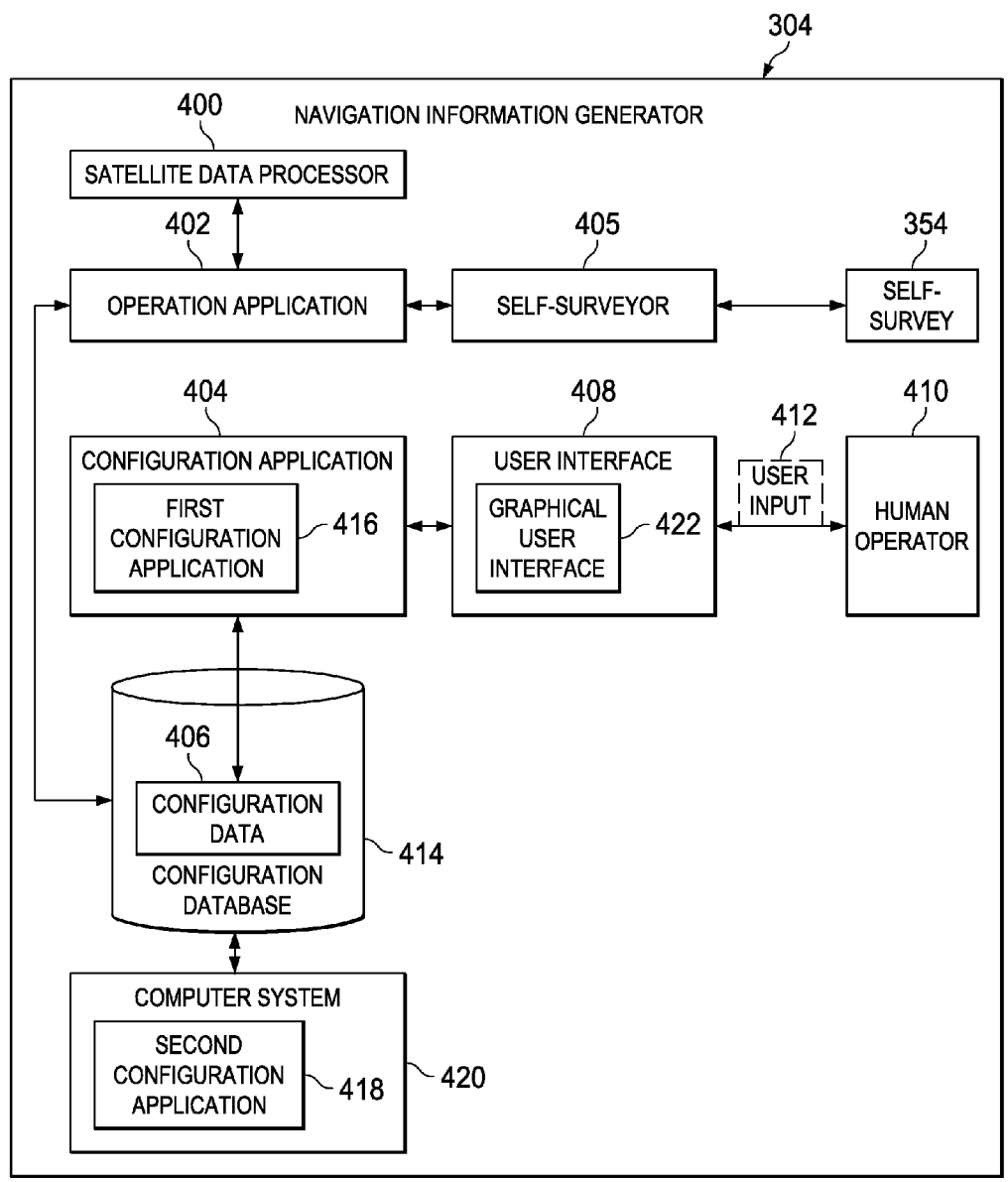
FIG. 4 is an illustration of a block diagram of a navigation information generator in accordance with an illustrative embodiment.

With reference next to FIG. 4, an illustration of a block diagram of a navigation information generator is depicted in accordance with an illustrative embodiment. In this illustrative example, a number of different components that may be used to implement navigation information generator 304 are shown in this figure. As depicted, navigation information generator 304 includes satellite data processor 400, operation application 402, configuration application 404, and self-surveyor 405.

As depicted, satellite data processor 400 receives satellite data 320 from the group of reference receivers 308 and generates messages 322 with navigation information 220 from satellite data 320 and configuration data 406. Message definitions in configuration data 406 and satellite data 320 are used by satellite data processor 400 to generate messages 322.

In this illustrative example, configuration data 406 is located in configuration database 414. Configuration database 414 is located in navigation information generator 304 in this example. Satellite data processor 400 sends messages 322 to aircraft 202 over transmitter system 302.

As depicted, operation application 402 controls operation of the group of reference receivers 308 in receiver system 300, transmitter system 302, and navigation information generator 304. In the illustrative example, navigation information generator 304 includes user interface 408 that allows human operator 410 to interact with operation application 402. In the illustrative example, user interface 408 may be graphical user interface 422. For example, configuration application 404 and operation application 402 display graphical user interface 422 and receive user input 412 through graphical user interface 422.

In other illustrative examples, the operator may be another device or computer user that interacts with operation application 402 through user interface 408. In this type of implementation, user interface 408 may be a library of application programming interfaces (APIs) for some other type of interface.

In the illustrative example, configuration application 404 receives user input 412 from human operator 410 to access configuration data 406 used by satellite data processor 400 to generate messages 322. Configuration data 406 includes values or other information for use in messages 322. This access may be at least one of reading, writing, or editing configuration data 406.

Configuration data 406 is included in messages 322 with pseudo-range correction data 232 to form navigation information 220 in this illustrative example. Navigation information 220 may also include at least one of take off information, landing information, approach information, missed approach information, or other suitable information.

In the illustrative example, self-surveyor 405 in navigation information generator 304 performs self-survey 354. As depicted, self-surveyor 405 identifies group of locations 326 where the group of reference receivers 308 were placed and indicates whether the group of reference receivers 308 provide desired level of accuracy 328 at group of locations 326. As a result, a first reference receiver in the group of reference receivers 308 may be placed at a new location that has not been surveyed prior to the first reference receiver being placed at the new location.

In this depicted example, configuration data 406 may also include information for the group of reference receivers 308 in receiver system 300. Configuration data 406 may be used to set parameters in the group of reference receivers 308 and may include information used to determine if the group of reference receivers 308 have desired level of accuracy 328. For example, desired level of accuracy 328 may be in configuration data 406.

Further, in this illustrative example, configuration application 404 is first configuration application 416. Also, second configuration application 418 is located on computer system 420. Second configuration application 418 on computer system 420 receives user input 412 at computer system 420 to access configuration data 406 used by satellite data processor 400 to generate messages 322.

Figure 5:
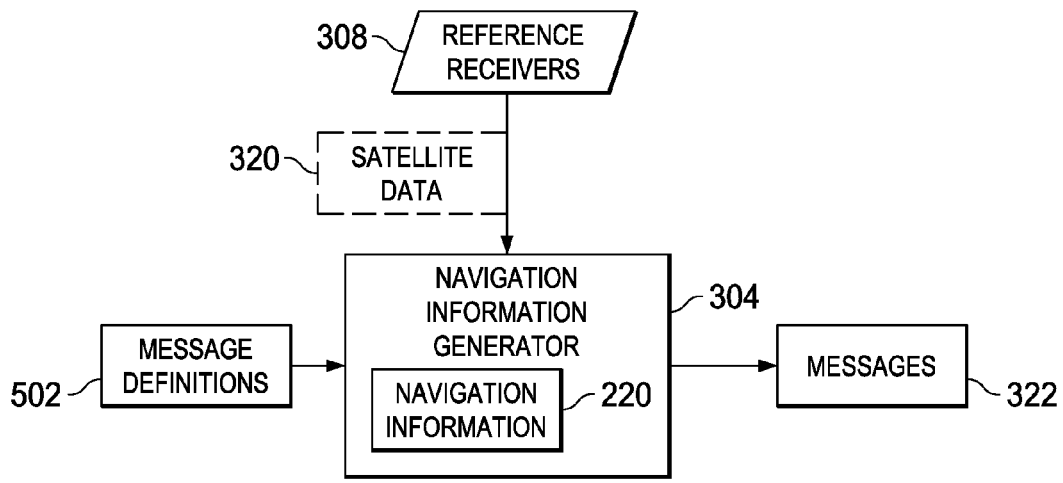
FIG. 5 is an illustration of a data flow for generating messages in accordance with an illustrative embodiment.

Turning now to FIG. 5, an illustration of a data flow for generating messages is depicted in accordance with an illustrative embodiment. As depicted, navigation information generator 304 receives satellite data 320 from the group of reference receivers 308. In this illustrative example, navigation information generator 304 generates navigation information 220 from satellite data 320.

As depicted, message definitions 502 are used by navigation information generator 304 in this process for generating messages 322. Message definitions 502 specify formats of navigation information 220 in messages 322.

In this illustrative example, each message definition in message definitions 502 is for generating a message of a particular type that contains data from navigation information 220. The formats specified by message definitions 502 identify the data in navigation information 220 that is used to generate messages 322.

In the illustrative example, navigation information generator 304 generates messages 322 using navigation information 220 in the formats specified by message definitions 502. For example, a pseudo-range correction message definition in message definitions 502 may specify how pseudo-range correction data 232 from navigation information 220 are placed in messages 322 for aircraft. Message definitions 502 may include at least one of a type 1 message definition with differential corrections for 100 second smoothed pseudo-ranges, a type 2 message definition with portable augmentation system geographic information, a type 4 message definition with approach and landing information, an industry defined message definition, message definitions defined by a human operator of navigation information generator 304, or other suitable types of message definitions.

Figure 6:
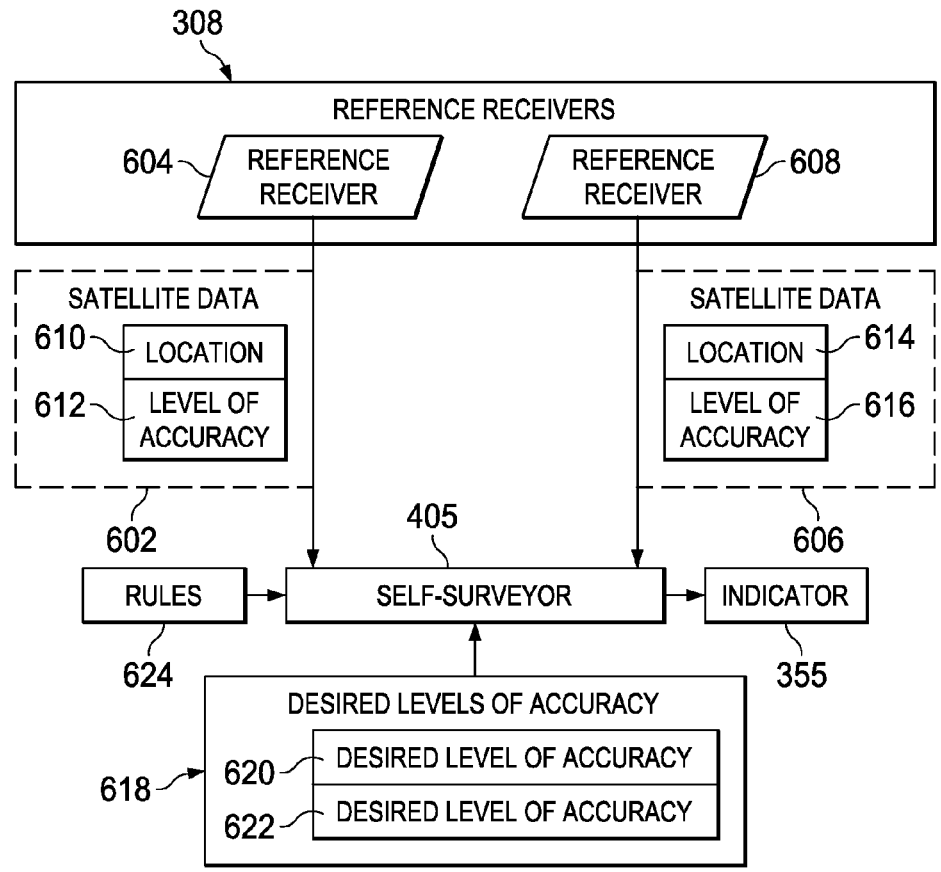
FIG. 6 is an illustration of a data flow for determining whether a desired level of accuracy has been met for a group of reference receivers in accordance with an illustrative embodiment.

Turning next to FIG. 6, an illustration of a data flow for determining whether a desired level of accuracy has been met for a group of reference receivers is depicted in accordance with an illustrative embodiment. As depicted, reference receiver 604 and reference receiver 608 are examples of reference receivers in the group of reference receivers 308.

In the illustrated example, self-surveyor 405 receives satellite data 602 from reference receiver 604 and satellite data 606 from reference receiver 608. Satellite data 602 and satellite data 606 are examples of satellite data 320 in FIG. 3. As depicted, satellite data 602 is different than satellite data 606.

In this illustrative example, self-surveyor 405 identifies location 610 where reference receiver 604 was placed using satellite data 602. Self-surveyor 405 also identifies level of accuracy 612 of location 610 using satellite data 602. For example, reference receiver 604 may send location 610 and level of accuracy 612 of location 610 in satellite data 602.

As depicted, self-surveyor 405 identifies location 614 where reference receiver 608 was placed using satellite data 606. Self-surveyor 405 also identifies level of accuracy 616 of location 614 using satellite data 606. For example, reference receiver 608 may send location 614 and level of accuracy 616 of location 614 in satellite data 606. Location 610 and location 614 are examples of locations in group of locations 326 in FIG. 3.

In this illustrative example, self-surveyor 405 uses a group of desired levels of accuracy 618 for the group of reference receivers 308 to identify whether level of accuracy 612 and level of accuracy 616 together meet desired level of accuracy 350 for pseudo-range correction data 232. Desired level of accuracy 620 for reference receiver 604 and desired level of accuracy 622 for reference receiver 608 are examples of desired level of accuracy 328 in FIG. 3. As depicted, desired level of accuracy 620 may be the same as desired level of accuracy 622. Desired level of accuracy 620 may be different than desired level of accuracy 622.

In the illustrated example, self-surveyor 405 determines whether desired level of accuracy 350 has been met for pseudo-range correction data 232 based on a group of rules 624 for the group of desired levels of accuracy 618 for the group of reference receivers 308. For example, a rule in the group of rules 624 may specify that one or more of the group of receivers must meet their required level of accuracy in the group of desired levels of accuracy 618 for the group of reference receivers 308.

As another example, another rule in the group of rules 624 may specify that two or more of the group of reference receivers 308 must meet the required accuracy for the two or more of the group of reference receivers 308, or some other suitable type of rule. This rule that two or more of the group of reference receivers 308 may be used by self-surveyor 405 when redundancy is required.

As depicted, self-surveyor 405 generates indicator 355 based on the determination as to whether desired level of accuracy 350 has been meet for pseudo-range correction data 232 based on the group of rules 624 for the group of desired levels of accuracy 618 for group of reference receivers 308. Indicator 355 includes at least one of level of accuracy 612, level of accuracy 616, the group of desired levels of accuracy 618, location 610 for reference receiver 604, location 614 for reference receiver 608, the determination as to whether desired level of accuracy 350 has been meet for pseudo-range correction data 232, or other suitable types of information about desired level of accuracy 350 of pseudo-range correction data 232.

In this illustrative example, indicator 355 may be presented in a number of different ways. For example, indicator 355 may be selected from at least one of an email, a text message, a popup window with a message, a graphical indicator, a sound, a color, text, flashing graphics, icons, a light on a hardware panel, or in some other suitable manner.

Figure 7:
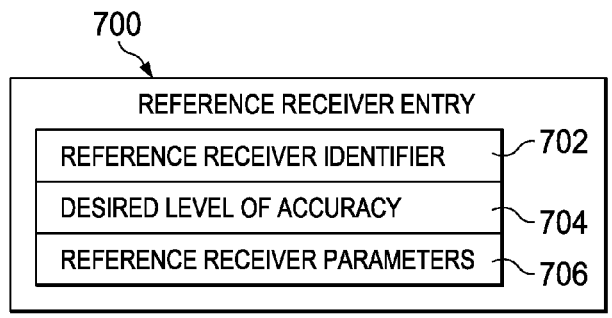
FIG. 7 is an illustration of a block diagram of a reference receiver entry in accordance with an illustrative embodiment.

With reference next to FIG. 7, an illustration of a block diagram of a reference receiver entry is depicted in accordance with an illustrative embodiment. As depicted, reference receiver entry 700 is an example of an entry in configuration database 414 in FIG. 4. Reference receiver entry 700 includes information for a reference receiver in the group of reference receivers 308.

In this illustrative example, reference receiver entry 700 includes a number of different fields. As depicted, reference receiver entry 700 includes reference receiver identifier 702, desired level of accuracy 704, and reference receiver parameters 706.

In the illustrative example, reference receiver identifier 702 identifies a reference receiver in the group of reference receivers 308 in FIG. 3. Reference receiver identifier 702 is at least one of a serial number, names, alpha numeric text for pointing, or in some other manner to identify a reference receiver. For example, reference receiver identifier 702 may be alphanumeric text.

In this example, reference receiver identifier 702 may be assigned to the reference receiver in the group of reference receivers 308. Desired level of accuracy 704 is a level of accuracy desired for a reference receiver identified by reference receiver identifier 702 in this illustrative example.

As depicted, reference receiver parameters 706 may be sent to the reference receiver identified by reference receiver identifier 702 to set values for parameters that the reference receiver uses to operate and process satellite signals. Reference receiver parameters 706 include at least one of satellite data rates, satellite data types, or other suitable parameters for specifying operations of the reference receiver identified by reference receiver identifier 702.

Figure 8:
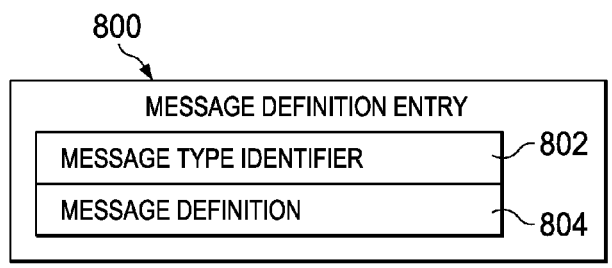
FIG. 8 is an illustration of a block diagram of a message definition entry in accordance with an illustrative embodiment.

With reference next to FIG. 8, an illustration of a block diagram of a message definition entry is depicted in accordance with an illustrative embodiment. As depicted, message definition entry 800 is an example of an entry in configuration database 414 in FIG. 4.

In this illustrative example, message definition entry 800 includes a number of different fields. As depicted, message definition entry 800 includes message type identifier 802 and message definition 804.

Message type identifier 802 identifies message definition 804 in this illustrative example. Message type identifier 802 is a type of message in messages 322 in FIG. 3. Message definition 804 is an example of a message definition in message definitions 502 in FIG. 5.

For example, message definition 804 may be a type 4 message containing a final approach segment (FAS) data block. In this example, message definition 804 may include parameters for at least one of data set length, operation type, service provider identifier, airport identifier, runway number, runway letter, approach performance designator, route indicator, reference path data selector, reference path identifier, Landing Threshold Point/Fictitious Threshold Point latitude, Landing Threshold Point/Fictitious Threshold Point longitude, Landing Threshold Point/Fictitious Threshold Point height, delta Flight Path Alignment Point latitude, delta Flight Path Alignment Point longitude, approach threshold crossing height, approach Threshold Crossing Height units selector, glide path angle, course width at threshold, delta length offset, final approach segment Cycle Redundancy Check, or other suitable parameters for a Type 4 message definition.

In illustrative example, message definition 804 may include parameters for at least one of time of validity, additional message flag, number of measurements, measurement type, low frequency correction information, ephemeris decorrelation parameter, ranging source ephemeris cycle redundancy check, ranging source availability duration information and the ranging source data for multiple measurement blocks including ranging source identifier, issue of data, pseudo-range correction, range rate correction, statistical bound of the signal in space errors, estimates of the error resulting from specific reference receiver measurements on the pseudo-range corrections, or other suitable parameters for a Type 1 message definition.

Figure 9:
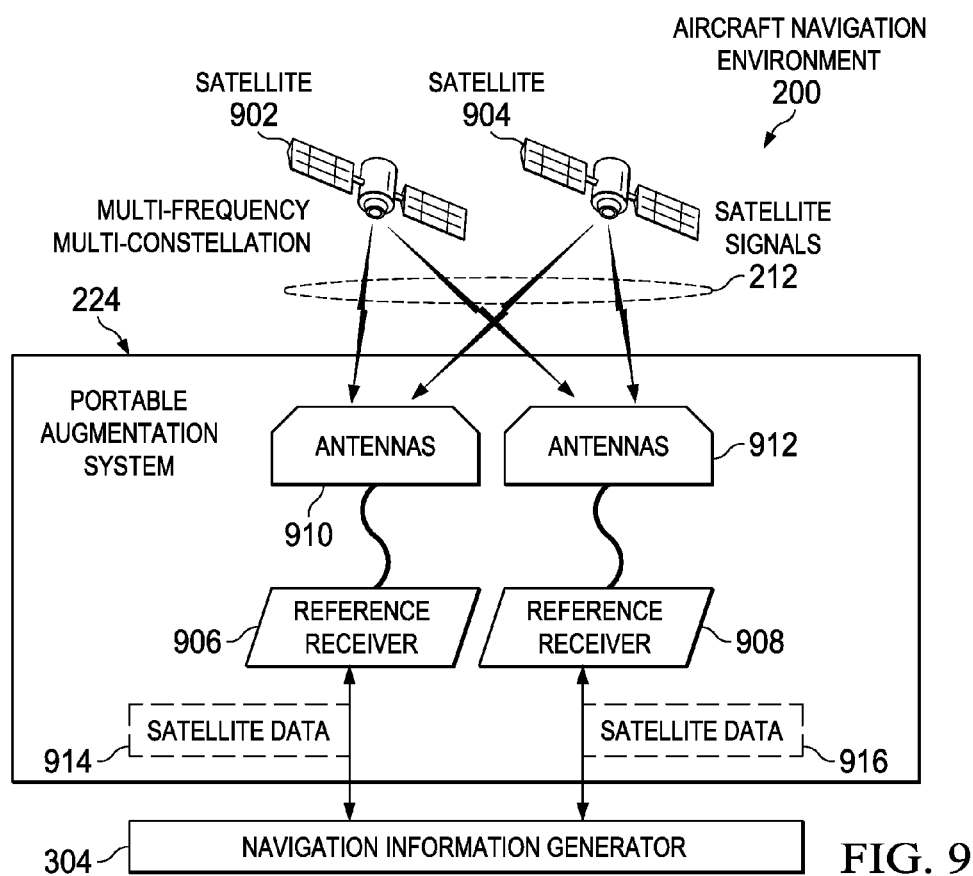
FIG. 9 is an illustration of an aircraft navigation environment in accordance with an illustrative embodiment.

Turning now to FIG. 9, an illustration of an aircraft navigation environment is depicted in accordance with an illustrative embodiment. In FIG. 9, an example of an implementation for components in aircraft navigation environment 200 is shown in this figure.

In this illustrative example, satellite 902 and satellite 904 are examples of satellites in group of satellites 214 in FIG. 2. Satellite 902 and satellite 904 send satellite signals 212 that allow reference receiver 906 and reference receiver 908 to determine the positions of reference receiver 906 and reference receiver 908.

As depicted, satellite 902 is part of a first constellation of a Global Positioning Satellite System. Satellite 904 is part of a second constellation of a Global Navigation Satellite System in this illustrative example. In the illustrative example, satellite signals 212 include signals sent over a first range of frequencies from satellite 902 and signals sent over a second range of frequencies from satellite 904.

As depicted, reference receiver 906 receives satellite signals 212 through a group of antennas 910 and reference receiver 908 receives satellite signals 212 through a group of antennas 912. Each antenna in the group of antennas 910 and the group of antennas 912 is designed to receive one or more portions of satellite signals 212. In this illustrative example, each antenna in the group of antennas 910 and the group of antennas 912 is located on at least one of a tripod, a reference receiver, a parked vehicle, or some other type of platform for an antenna to receive satellite signals 212.

In this illustrative example, reference receiver 906 sends satellite data 914 to navigation information generator 304. Reference receiver 908 sends satellite data 916 to navigation information generator 304. Satellite data 914 and satellite data 916 are examples of satellite data 320 in FIG. 3.

Figure 10:
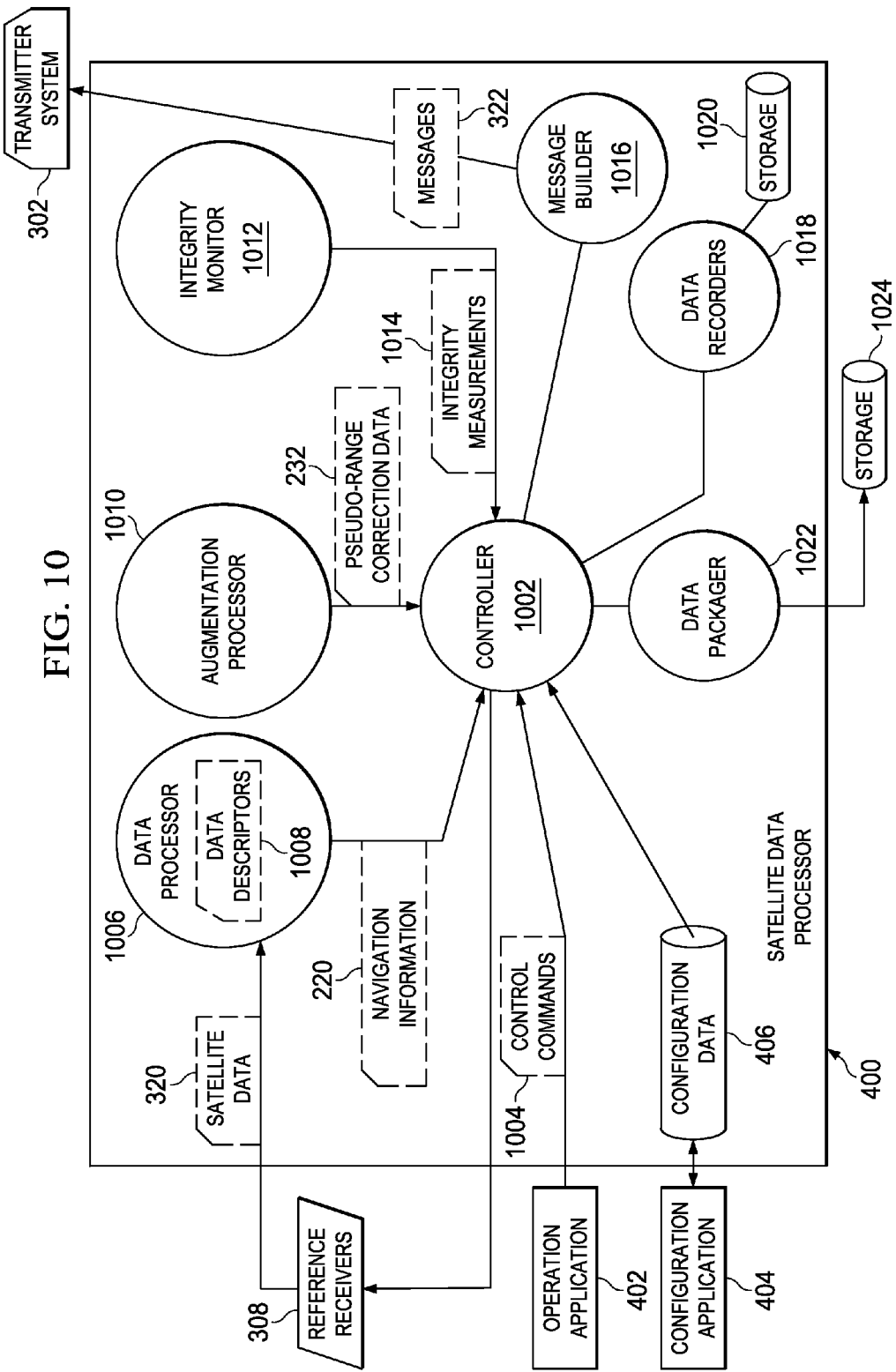
FIG. 10 is an illustration of a satellite data processor in accordance with an illustrative embodiment.

With reference next to FIG. 10, an illustration of a satellite data processor is depicted in accordance with an illustrative embodiment. In this illustrative example, controller 1002 is an example of an implementation for satellite data processor 400. In this illustrative example, controller 1002 orchestrates flow of data and messages between other components of satellite data processor 400.

As depicted, controller 1002 receives control commands 1004 from operation application 402. Control commands 1004 are for managing components of portable augmentation system 224. Control commands 1004 include at least one of a command to start processing of satellite signals by the group of reference receivers 308, a command to start processing of satellite signals by a selected reference receiver in the group of reference receivers 308, a command to stop processing of satellite signals by the group of reference receivers 308, a command to stop processing of satellite signals by a selected reference receiver in the group of reference receivers 308, a command to re-start processing of satellite signals by the group of reference receivers 308, a command to re-start processing of satellite signals by a selected reference receiver in the group of reference receivers 308, a command to send reference receiver parameters to a selected reference receiver in the group of reference receivers 308, and other suitable types of commands for processing by controller 1002.

For example, controller 1002 retrieves reference receiver parameters 706 from reference receiver entry 700 in configuration data 406 and sends reference receiver parameters 706 to the reference receiver when controller 1002 receives a command to send reference receiver parameters 706 to a reference receiver identified by reference receiver identifier 702. As another example, controller 1002 starts processing of satellite signals by the group of reference receivers 308 by at least one of powering up the group of reference receivers 308 or sending a group of start commands to the group of reference receivers 308 when controller 1002 receives a command to start processing satellite signals by the group of reference receivers 308.

As depicted, data processor 1006 is a component in satellite data processor 400 that receives satellite data 320 from the group of reference receivers 308. In this illustrative example, data processor 1006 uses a group of data descriptors 1008 to parse satellite data 320. Each data descriptor in the group of data descriptors 1008 may be unique to a provider of a reference receiver in the group of reference receivers 308.

As depicted, data descriptors 1008 specify how to retrieve portions of navigation information 220 from satellite data 320. The group of data descriptors 1008 can be modified by a human operator through operation application 402. The group of data descriptors 1008 may be stored in configuration data 406.

In this illustrative example, data processor 1006 uses time information embedded in satellite data 320 to add time stamps to portions of navigation information 220 retrieved from satellite data 320. As depicted, data processor 1006 sends satellite data 320 and navigation information 220 to controller 1002 after retrieving navigation information 220 and adding time stamps to portions of navigation information 220.

As depicted, controller 1002 uses augmentation processor 1010 and navigation information 220 to calculate pseudo-range correction data 232. For example, augmentation processor 1010 may identify pseudo-range correction data 232.

In this illustrative example, controller 1002 uses integrity monitor 1012 to generate integrity measurements 1014. As depicted, integrity measurements 1014 are based on satellite data 320. For example, integrity measurements 1014 may be used to identify whether an issue exists in satellite data 320 based on uncharacteristic variations in satellite data 320.

In the illustrative example, controller 1002 uses message builder 1016 to generate messages 322. As depicted, message builder 1016 generates messages 322 using navigation information 220 in formats specified by message definitions 502.

As depicted, controller 1002 uses a group of data recorders 1018 to store at least one of satellite data 320, control commands 1004, configuration data 406, indicator 355, systems health information generated by various components in satellite data processor, or operations performed by components of satellite data processor 400 in storage 1020. Controller 1002 uses data packager 1022 to store portions of storage 1020 in storage 1024. For example, data packager 1022 may use a universal serial bus (USB) to access storage 1024 to store a portion of storage 1020 in storage 1024.

The illustration of aircraft navigation environment 200 and the different components in aircraft navigation environment 200 in FIGS. 2-10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a power supply may be included in navigation information generator 304 or may be a separate component. The power supply is connected to the group of reference receivers 308, transmitter system 302, and navigation information generator 304. As another example, computer system 420 may be at a different location than navigation information generator 304.

Figure 11:
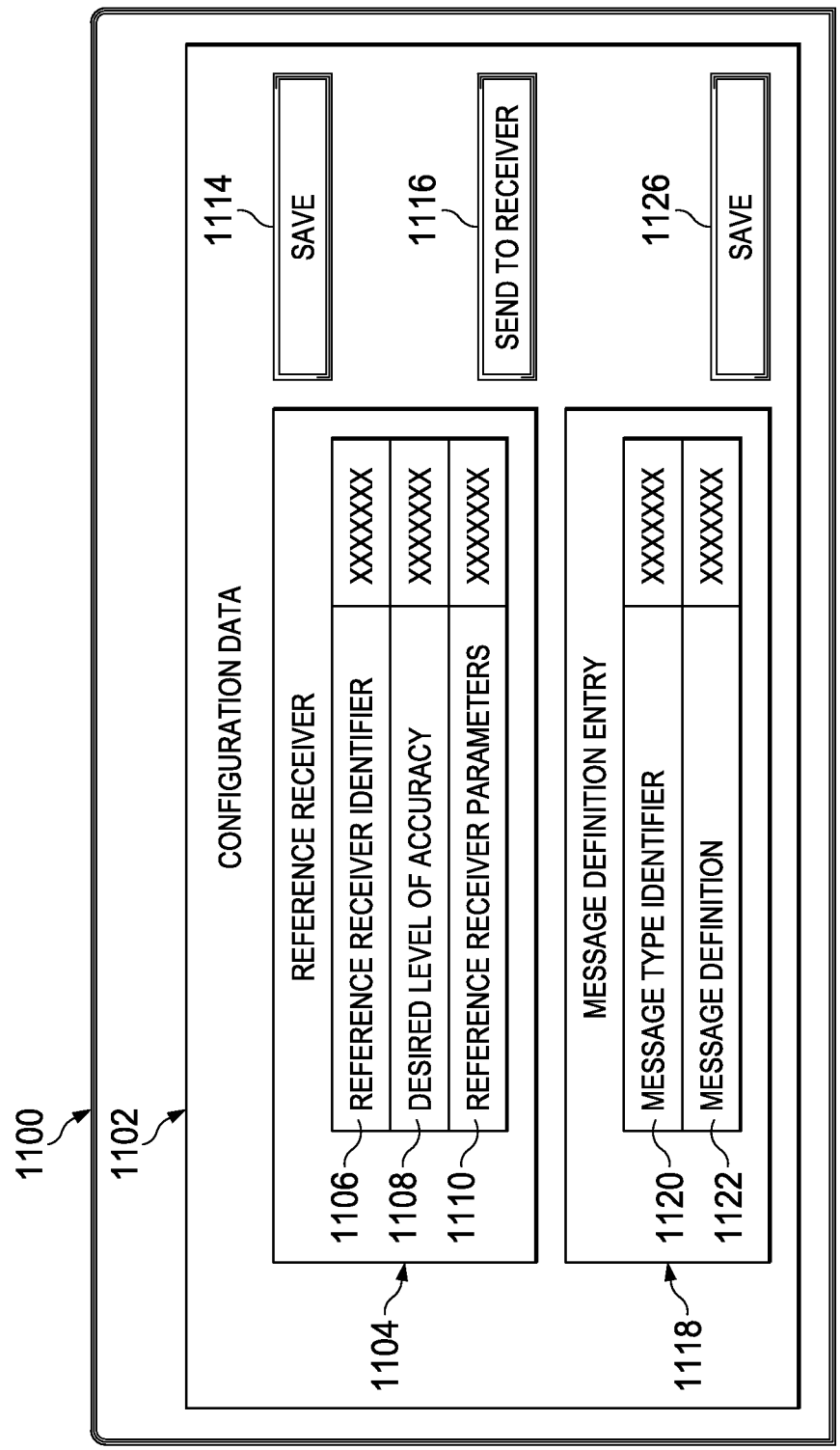
FIG. 11 is an illustration of a graphical user interface for managing configuration data in accordance with an illustrative embodiment.

With reference next to FIG. 11, an illustration of a graphical user interface for managing configuration data is depicted in accordance with an illustrative embodiment. As depicted, graphical user interface 1102 is an implementation of graphical user interface 422 shown in block form in FIG. 4. Display 1100 is an example of a display on computer system 420 in FIG. 4 where graphical user interface 1102 is presented.

In this illustrative example, reference receiver 1104 is a window in graphical user interface 1102 used by a human operator to set desired levels of accuracy for reference receivers in the group of reference receivers 308 and to set reference receiver parameters for reference receivers in the group of reference receivers 308. For example, a human operator may select a reference receiver in the group of reference receivers 308 by entering a reference receiver identifier for the reference receiver in reference receiver identifier 1106. In this example, a desired level of accuracy for the reference receiver is retrieved from configuration data 406 and shown in desired level of accuracy 1108. Reference receiver parameters for reference receiver 1104 are retrieved from configuration data 406 and shown in reference receiver parameters 1110.

Further, in this example, the human operator may set a desired level of accuracy for reference receiver 1104. For example, the desired level may be set by editing desired level of accuracy 1108 and setting reference receiver parameters 1110 for reference receiver 1104 by editing reference receiver parameters 1110.

As depicted, save 1114 is a button in graphical user interface 1102 selected by a human operator to store the desired level of accuracy for the reference receiver shown in desired level of accuracy 1108 and the receiver parameters for the reference receiver shown in reference receiver parameters 1110 in configuration data 406. In this illustrative example, send to receiver 1116 is a button in graphical user interface 1102 selected by a human operator to send the desired level of accuracy for the reference receiver shown in desired level of accuracy 1108 and the receiver parameters for the reference receiver shown in reference receiver parameters 1110 to the reference receiver.

In this illustrative example, message definition entry 1118 is a window in graphical user interface 1102 used by a human operator to set message definitions used by satellite data processor 400 to generate messages 322. For example, a human operator may select a message definition in configuration data 406 by entering a message type identifier for the message definition in message type identifier 1120. In this example, a message definition matching the message type identifier is retrieved from configuration data 406 and shown in message definition 1122. Further, in this example, the human operator may set the message definition used by satellite data processor 400 to generate messages of the type matching message type identifier 1120 by editing message definition 1122. As depicted, save 1126 is a button in graphical user interface 1102 selected by a human operator to store the message definition shown in message definition 1122 in configuration data 406.

Figure 12:
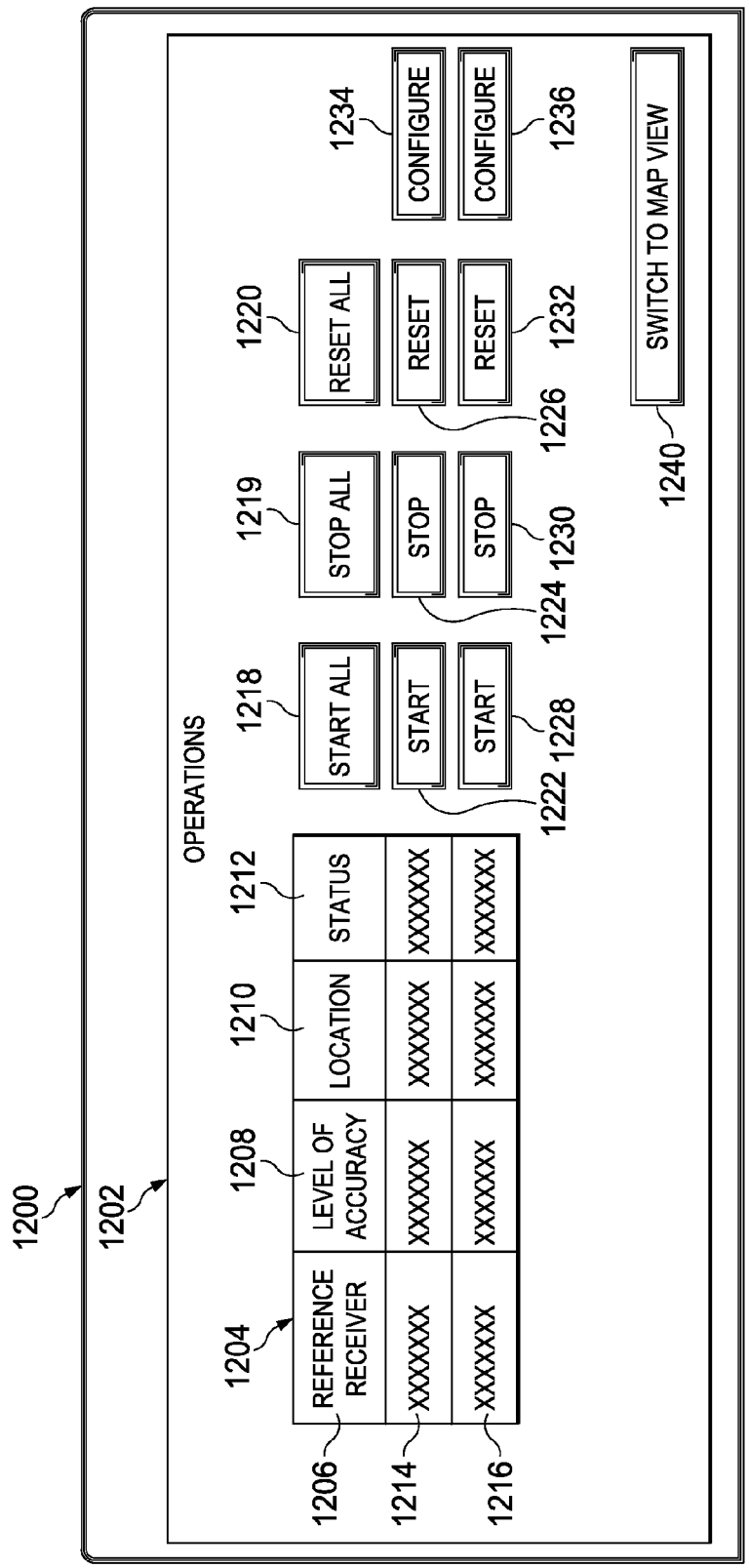
FIG. 12 is an illustration of a graphical user interface for an operations application of a portable augmentation system in accordance with an illustrative embodiment.

With reference next to FIG. 12, an illustration of a graphical user interface for an operations application of a portable augmentation system is depicted in accordance with an illustrative embodiment. Display 1200 is an example of a display on computer system 420 in FIG. 4 where graphical user interface 1202 is presented. As depicted, graphical user interface 1202 is an implementation of graphical user interface 422 shown in block form in FIG. 4. In this illustrative example, a group of reference receivers is shown on graphical user interface 1202 as table 1204. As depicted, table 1204 includes reference receiver identifiers for the group of reference receivers in column 1206, levels of accuracy for the group of reference receivers in column 1208, a group of locations of the group of reference receivers in column 1210, and indications of whether the group of locations of the group of reference receivers meet a desired level of accuracy in column 1212. Reference receiver 1214 and reference receiver 1216 in table 1204 are examples of a group of reference receivers 308 shown in FIG. 3.

As depicted, start all 1218 is a button in graphical user interface 1202 selected by a human operator to send a start command to all reference receivers shown in table 1204. Stop all 1219 is a button in graphical user interface 1202 selected by a human operator to send a stop command to all reference receivers shown in table 1204. Reset all 1220 is a button in graphical user interface 1202 selected by a human operator to send a re-start command to all reference receivers shown in table 1204.

In this illustrative example, start 1222 is a button in graphical user interface 1202 selected by a human operator to send a start command to reference receiver 1214. Stop 1224 is a button in graphical user interface 1202 selected by a human operator to send a stop command to reference receiver 1214. Reset 1226 is a button in graphical user interface 1202 selected by a human operator to send a re-start command to reference receiver 1214. In this illustrative example, start 1228 is a button in graphical user interface 1202 selected by a human operator to send a start command to reference receiver 1216. Stop 1230 is a button in graphical user interface 1202 selected by a human operator to send a stop command to reference receiver 1216. Reset 1232 is a button in graphical user interface 1202 selected by a human operator to send a re-start command to reference receiver 1216.

As depicted, configure 1234 is a button in graphical user interface 1202 selected by a human operator to display graphical user interface 1102 in FIG. 11 to manage configuration for reference receiver 1214. As also depicted, configure 1236 is a button in graphical user interface 1202 selected by a human operator to display graphical user interface 1102 in FIG. 11 to manage configuration for reference receiver 1216. In this illustrative example, switch to map view 1240 is a button in graphical user interface 1202 selected by a human operator to display another type of graphical user interface that shows group of reference receivers 308 on a map.

Figure 13:
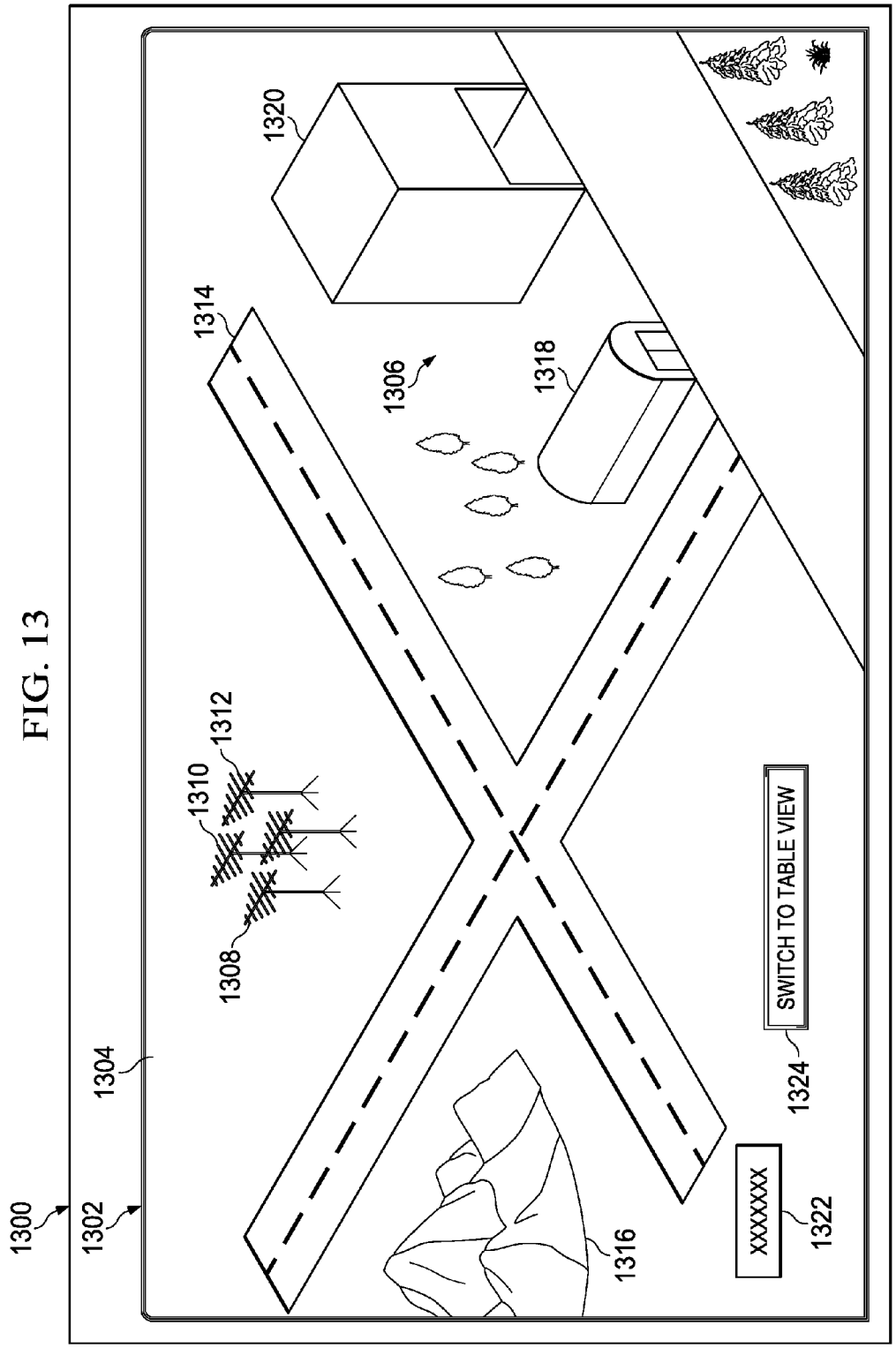
FIG. 13 is an illustration of a graphical user interface for an operations application of a portable augmentation system in accordance with an illustrative embodiment.

With reference next to FIG. 13, an illustration of a graphical user interface for an operations application of a portable augmentation system is depicted in accordance with an illustrative embodiment. Display 1300 is an example of a display on computer system 420 in FIG. 4 where graphical user interface 1302 is presented. As depicted, graphical user interface 1302 is an implementation of graphical user interface 422 shown in block form in FIG. 4. For example, graphical user interface 1302 may be displayed when switch to map view 1240 is selected in FIG. 12.

In this illustrative example, map 1304 on graphical user interface 1302 is a representation of an area where portable augmentation system 224 is located. For example, map 1304 may be at least one of a point cloud, a topographic map, a road map, a weather map, or other suitable types of maps for showing obstacles that reduce accuracy of location information derived from satellite signals 212. As used herein, a point cloud is a set of data points in a coordinate system that represent surface areas.

As depicted, map 1304 includes ground 1306 on which reference receiver 1308, reference receiver 1310, and reference receiver 1312 are located. Reference receiver 1308, reference receiver 1310, and reference receiver 1312 are examples of reference receivers 308.

In this illustrative example, map 1304 includes runway 1314, mountain 1316, building 1318, and building 1320. As depicted, a human operator may use indicator 1322 to determine whether to re-locate the group of reference receivers. Indicator 1322 is an example of indicator 355 in FIG. 3. In this illustrative example, switch to table view 1324 is a button in graphical user interface 1302 that displays graphical user interface 1202 in FIG. 12.

Figure 14:
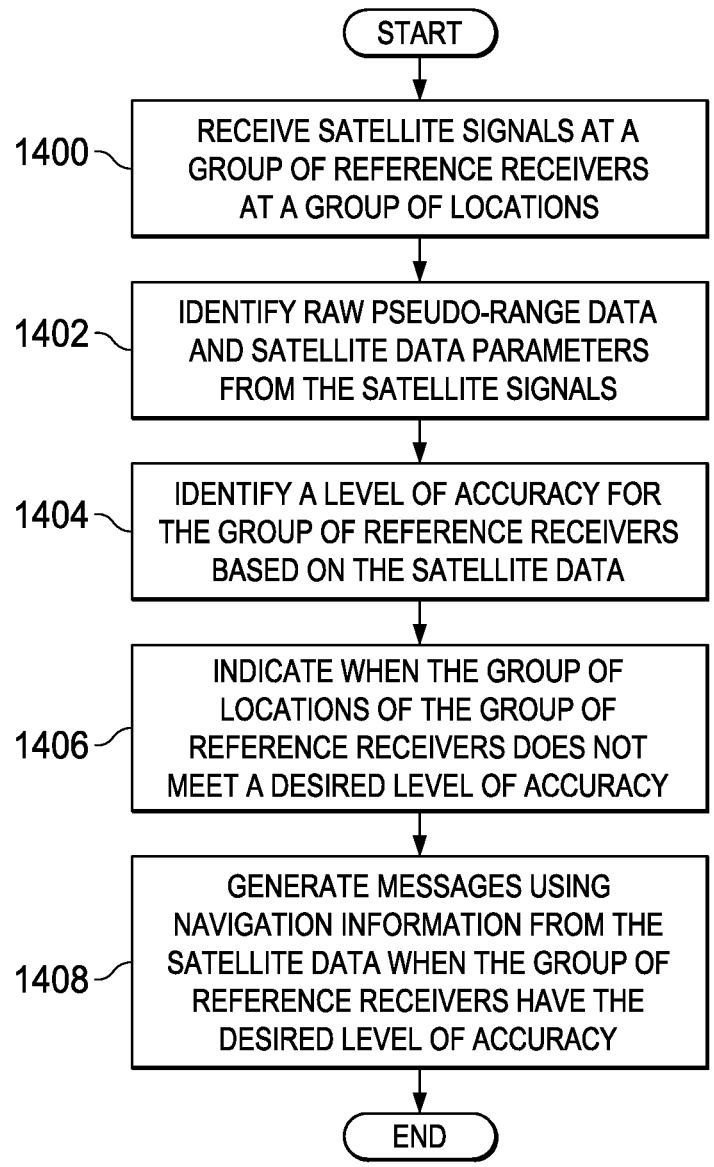
FIG. 14 is an illustration of a flowchart of a process for generating navigation information in a portable augmentation system in accordance with an illustrative embodiment.

Turning next to FIG. 14, an illustration of a flowchart of a process for generating navigation information in a portable augmentation system is depicted in accordance with an illustrative embodiment. The process illustrated in FIG. 14 may be implemented in portable augmentation system 224.

The process begins by receiving satellite signals at a group of reference receivers at a group of locations (operation 1400). Thereafter, the process identifies raw pseudo-range data and satellite data parameters from the satellite signals (operation 1402).

Next, the process identifies a level of accuracy for the group of reference receivers based on the satellite data (operation 1404). The process indicates when the group of locations of the group of reference receivers does not meet a desired level of accuracy (operation 1406). The process generates messages using navigation information from the satellite data when the group of reference receivers have the desired level of accuracy (operation 1408), with the process terminating thereafter.

Operations 1400-1408 may be repeated any number of times to process additional satellite signals at the group of reference receivers at the group of locations. Additionally, operations 1400-1408 may be repeated any number of times to process additional satellite signals at the group of reference receivers at a different group of locations for the group of reference receivers.

Figure 15:
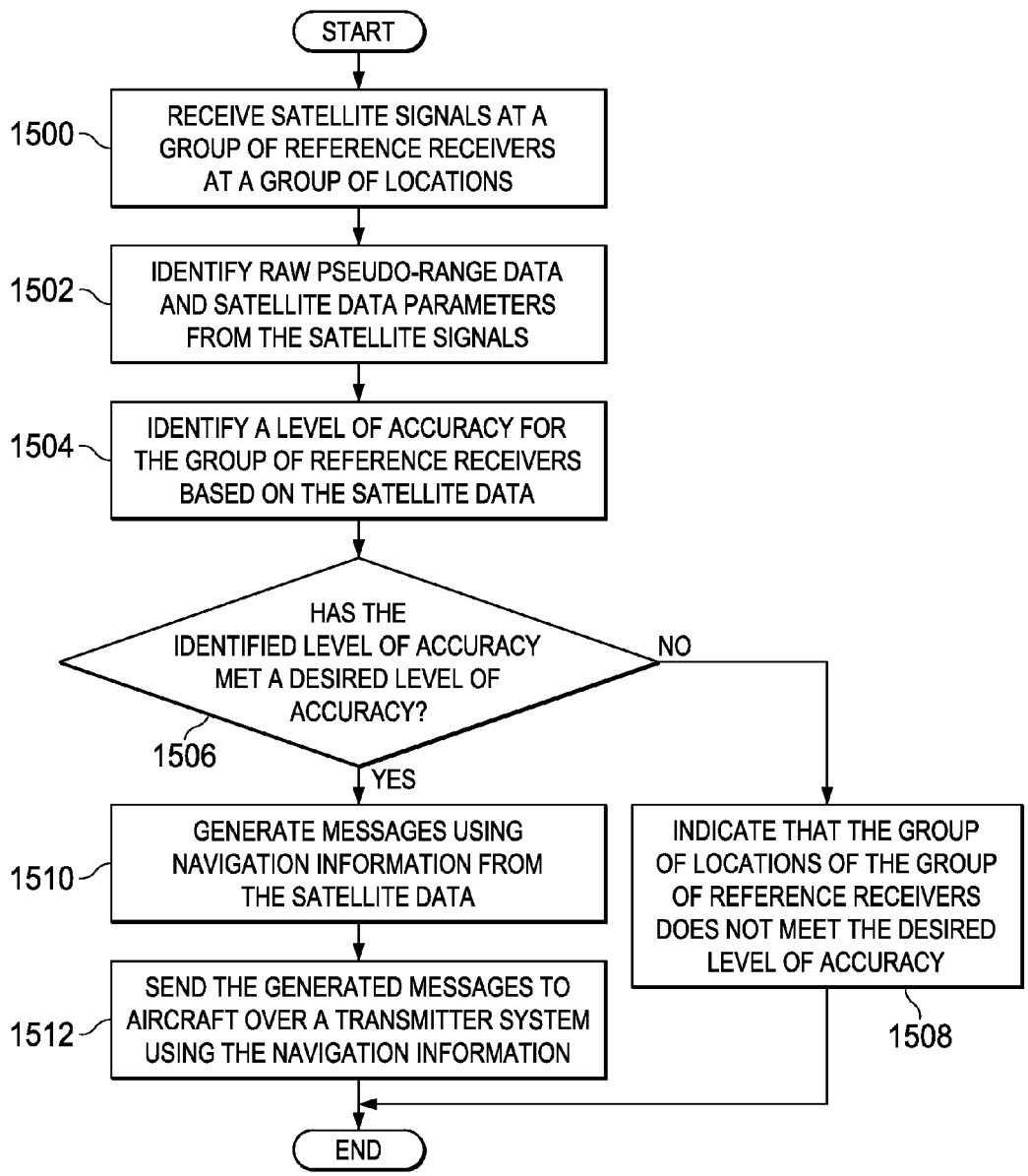
FIG. 15 is an illustration of a flowchart of a process for sending navigation information from a portable augmentation system in accordance with an illustrative embodiment.

Turning next to FIG. 15, an illustration of a flowchart of a process for sending navigation information from a portable augmentation system is depicted in accordance with an illustrative embodiment. The process illustrated in FIG. 15 may be implemented in portable augmentation system 224.

The process begins by receiving satellite signals at a group of reference receivers at a group of locations (operation 1500). Thereafter, the process identifies raw pseudo-range data and satellite data parameters from the satellite signals (operation 1502).

Next, the process identifies a level of accuracy for the group of reference receivers based on the satellite data (operation 1504). The process then determines whether the identified level of accuracy meets a desired level of accuracy (operation 1506).

As depicted, if the desired level of accuracy has not been met, the process indicates that the group of locations of the group of reference receivers does not meet the desired level of accuracy (operation 1508), with the process terminating thereafter. Otherwise, the process generates messages using navigation information from the satellite data (operation 1510). The process then sends the generated messages to aircraft over a transmitter system using the navigation information (operation 1512), with the process terminating thereafter. Operations 1500-1512 may be repeated any number of times to process at least one of additional satellite signals at the group of reference receivers at the group of locations or additional satellite signals at the group of reference receivers at a different group of locations for the group of reference receivers.

Figure 16:
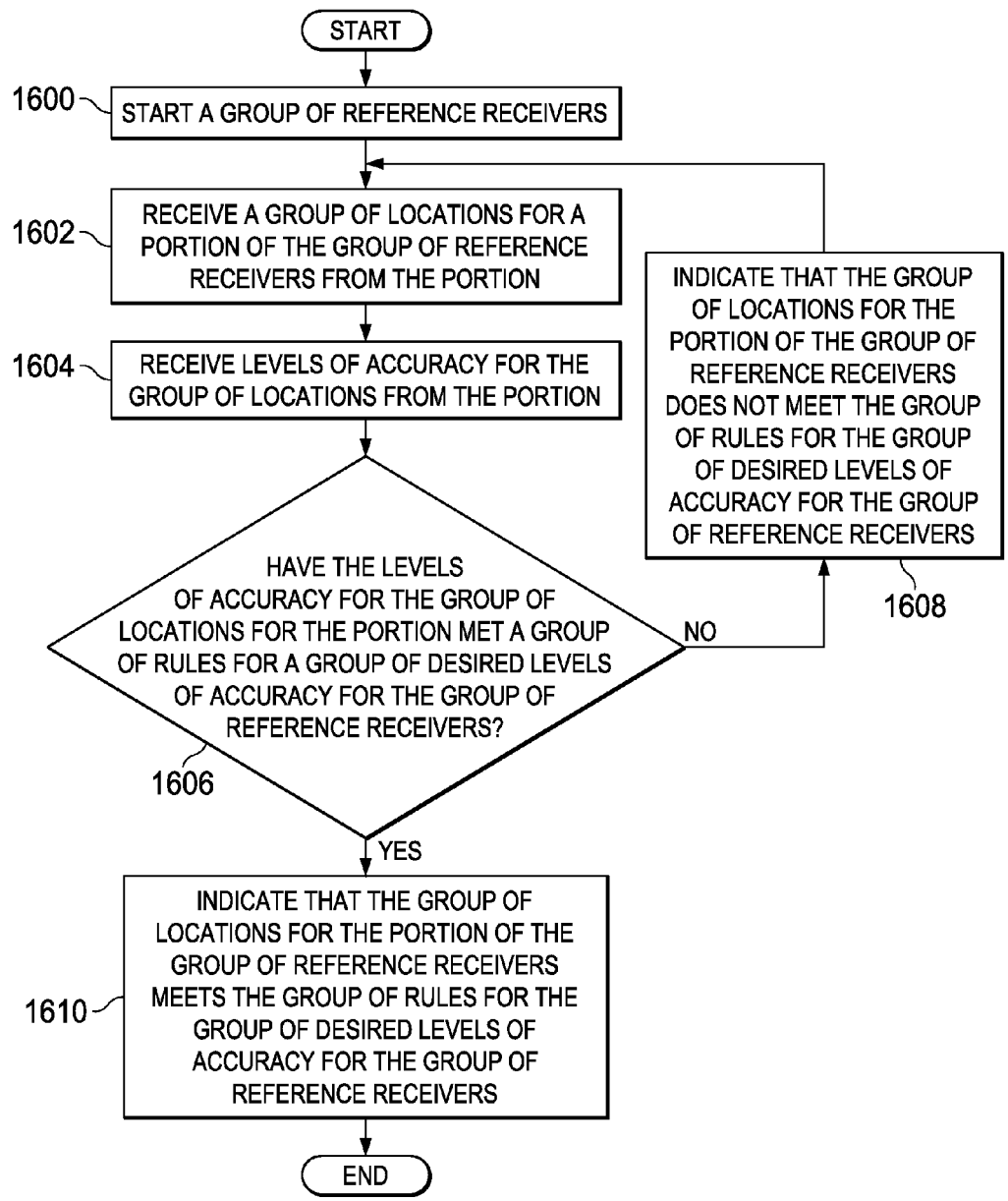
FIG. 16 is an illustration of a flowchart of a process for performing a self-survey in accordance with an illustrative embodiment.

Turning next to FIG. 16, an illustration of a flowchart of a process for performing a self-survey is depicted in accordance with an illustrative embodiment. The process illustrated in FIG. 16 may be implemented in portable augmentation system 224. In particular, the different operations may be performed by self-surveyor 405.

The process begins by starting a group of reference receivers (operation 1600). Thereafter, the process receives a group of locations for a portion of the group of reference receivers from the portion (operation 1602).

Next, the process receives levels of accuracy for the group of locations from the portion (operation 1604). The process determines whether the levels of accuracy for the group of locations for the portion meet a group of rules for a group of desired levels of accuracy for the group of reference receivers (operation 1606).

As depicted, when the group of rules has not been met, the process indicates that the group of locations for the portion of the group of reference receivers does not meet the group of rules for the group of desired levels of accuracy for the group of reference receivers (operation 1608), with the process returning to operation 1602. When the indication is made that the group of locations for the portion of the group of reference receivers does not meet the group of rules for the group of desired levels of accuracy for the group of reference receivers, a human operator may use graphical user interface 422 to identify information about the group of reference receivers. Additionally, the human operator may use a device to generate a point cloud of the area where the group of receivers is located for use as map 1304 in FIG. 13.

Otherwise, when the group of rules has been met, the process indicates that the group of locations for the portion of the group of reference receivers meets the group of rules for the group of desired levels of accuracy for the group of reference receivers (operation 1610), with the process terminating thereafter.

Operations 1602-1610 may be repeated any number of times. For example, operations 1602-1610 may be repeated continuously, or when at least one of a change has occurred to configuration data, a change has occurred to the group of locations for the portion, an amount of time has elapsed since the last time the process was run, a human operator selects a command to perform a self-survey, or other suitable reasons to repeat the process.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, additional operations may be performed in the process illustrated in FIG. 16. In one illustrative example, after performing operation 1608, the process may stop using satellite data from a reference receiver in the portion that has a respective level of accuracy that does not meet a desired level of accuracy for the reference receiver.

Figure 17:
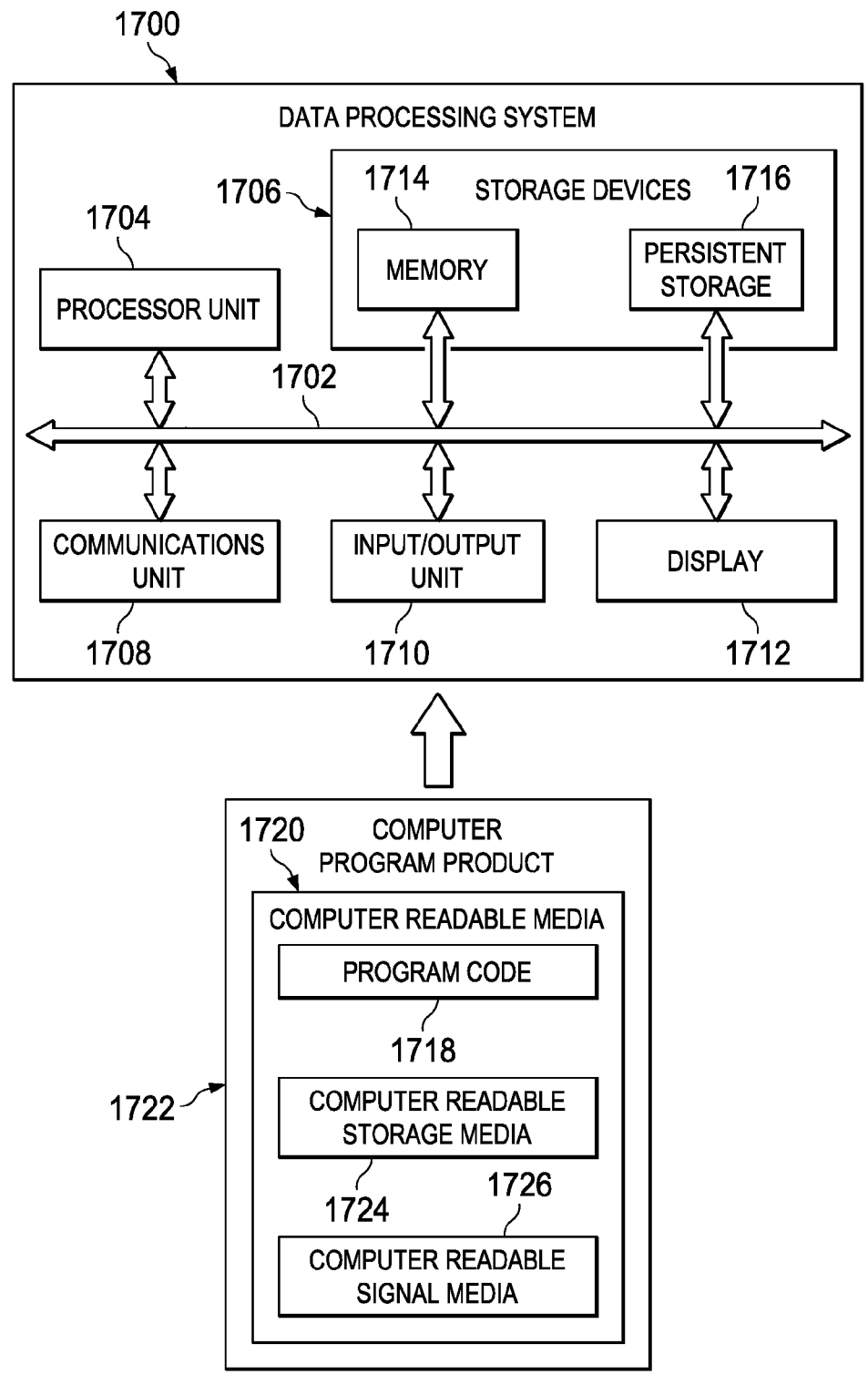
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement one or more computers in computer system 338 in FIG. 3 or computer system 420 in FIG. 4, as well as other hardware, mobile phones, tablet computers, or computers that may implement processes in illustrative examples. As depicted, data processing system 1700 includes communications framework 1702, which provides communications between processor unit 1704, storage devices 1706, communications unit 1708, input/output unit 1710, and display 1712. In some cases, communications framework 1702 may be implemented as a bus system.

Processor unit 1704 is configured to execute instructions for software to perform a number of operations. Processor unit 1704 may comprise a number of processors, a multiprocessor core, and/or some other type of processor, depending on the implementation. In some cases, processor unit 1704 may take the form of a hardware unit, such as a circuit system, an application specific integrated circuit (ASIC), a programmable logic device, or some other suitable type of hardware unit.

Instructions for the operating system, applications, and/or programs run by processor unit 1704 may be located in storage devices 1706. Storage devices 1706 may be in communication with processor unit 1704 through communications framework 1702. As used herein, a storage device, also referred to as a computer readable storage device, is any piece of hardware capable of storing information on a temporary and/or permanent basis. This information may include, but is not limited to, data, program code, and other information.

Memory 1714 and persistent storage 1716 are examples of storage devices 1706. Memory 1714 may take the form of, for example, a random access memory or some type of volatile or non-volatile storage device. Persistent storage 1716 may comprise any number of components or devices. For example, persistent storage 1716 may comprise a hard drive, a flash memory, a rewritable optical disk, a rewritable magnetic tape, or some combination of the above. The media used by persistent storage 1716 may or may not be removable.

Communications unit 1708 allows data processing system 1700 to communicate with other data processing systems and devices. Communications unit 1708 may provide communications using physical communications links, wireless communications links, or some combination thereof.

Input/output unit 1710 allows input to be received from and output to be sent to other devices connected to data processing system 1700. For example, input/output unit 1710 may allow user input to be received through a keyboard, a mouse, and/or some other type of input device. As another example, input/output unit 1710 may allow output to be sent to a printer connected to data processing system 1700.

Display 1712 is configured to display information to a user. Display 1712 may comprise, for example, without limitation, a monitor, a touch screen, a laser display, a holographic display, a virtual display device, or some other type of display device.

In this illustrative example, the processes of the different illustrative embodiments may be performed by processor unit 1704 using computer-implemented instructions. These instructions may be referred to as program code, computer usable program code, or computer readable program code and may be read and executed by one or more processors in processor unit 1704.

In these examples, program code 1718 is located in a functional form on computer readable media 1720, which is selectively removable, and may be loaded onto or transferred to data processing system 1700 for execution by processor unit 1704. Program code 1718 and computer readable media 1720 together form computer program product 1722. In this illustrative example, computer readable media 1720 may be computer readable storage media 1724 or computer readable signal media 1726.

Computer readable storage media 1724 is a physical or tangible storage device used to store program code 1718 rather than a medium that propagates or transmits program code 1718. Computer readable storage media 1724 may be, for example, without limitation, an optical or magnetic disk or a persistent storage device that is connected to data processing system 1700.

Alternatively, program code 1718 may be transferred to data processing system 1700 using computer readable signal media 1726. Computer readable signal media 1726 may be, for example, a propagated data signal containing program code 1718. This data signal may be an electromagnetic signal, an optical signal, and/or some other type of signal that can be transmitted over physical and/or wireless communications links.

The illustration of data processing system 1700 in FIG. 17 is not meant to provide architectural limitations to the manner in which the illustrative embodiments may be implemented. The different illustrative embodiments may be implemented in a data processing system that includes components in addition to or in place of those illustrated for data processing system 1700. Further, components shown in FIG. 17 may be varied from the illustrative examples shown.

Thus the illustrative embodiments provide a method and apparatus for providing a desired level of portability to augmentation systems. In one or more illustrative examples, reduced time and effort is needed to set up a portable augmentation system with a desired level of precision in generating pseudo-range correction data. In an illustrative example, a self-survey process, as described above, reduces pre-planning, time, and effort needed by eliminating the need for a survey to be performed prior to setting up the portable augmentation system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A portable augmentation system that comprises:
a reference receiver, the reference receiver comprising a single antenna ground-based reference receiver at a position that comprises an unidentified location, and configured to:
  receive satellite signals;
  based upon the satellite signals determine a location for the reference receiver;
  form satellite data that comprises raw pseudo-range data and a group of satellite data parameters that comprise: satellite clock correction coefficients data, satellite position data, carrier waves, ranging codes, and atmospheric error data; and
  send the satellite data to a navigation information generator that comprises: a self-surveyor, a configuration application, an operation application, and a satellite data processor, the navigation information generator configured to:
    receive the satellite data from the reference receiver;
    determine, based on navigation information in the satellite data and a self-survey of the location from the reference receiver, a level of accuracy for the location of the reference receiver;
    indicate on a display when the level of accuracy for the location of the reference receiver does not meet a desired level of accuracy for the location of the reference receiver; and
    generate:
      a pseudo-range correction data, responsive to a determination by the self-surveyor that the level of accuracy of the location comprises the desired level of accuracy for an identification of the position of the location;
      based upon a group of rules for the level of accuracy of the location, a level of accuracy for the pseudo-range correction data;
      an indicator that the level of accuracy for the pseudo-range correction data comprises the desired level of accuracy for the pseudo-range data correction; and
      messages that comprise the pseudo-range correction data configured to adjust an identified position of a mobile receiver.

2. The portable augmentation system of claim 1 further comprising:
the satellite signals comprising signals from a plurality of constellations of satellites and satellite navigation systems;
the reference receiver configured to receive a start command from a user interface;
the configuration application configured to provide a user interface access to a configuration database;
a transmitter system configured to transmit the messages to an aircraft: and
the navigation information generator configured to:
  receive, in the satellite data processor, satellite data that comprises a message definition that comprises at least one of: a type 1 message definition, a type 2 message definition, a type 4 ;message definition; and a message definition defined via a user interface;
  generate a message that comprises: a format specified by the message definition, and configuration data; and
  send the messages to the aircraft over the transmitter system.

3. The portable augmentation system of claim 1, further comprising:
the portable augmentations system comprising a group of cases, each case in the group of cases being man-portable;
a first group of locations for a group of reference receivers that comprises the reference receiver;
a first level of accuracy for the first group of locations for the group of reference receivers;
the satellite data comprising first satellite data; and
the navigation information generator configured to identify, responsive to a movement of a portion of group of reference receivers, to a second group of locations that differs from the first group of locations, a second level of accuracy for the group of reference receivers based on second satellite data identified, from second satellite signals, by the group of reference receivers.

4. The portable augmentation system of claim 1, further comprising:
a first level of accuracy, for a group of reference receivers that comprises the reference receiver, being based on the satellite data;
a transmitter configured to transmit the messages;
the satellite data comprises first satellite data, and further comprising:
the navigation information generator configured to identify, based on second satellite data formed from the satellite signals from the group of reference receivers and responsive to a portion of the group of reference receivers being one or more of re-powered and re-configured, a second level of accuracy for the group of reference receivers.

5. A method of generating navigation information for an aircraft, the method comprising:
receiving, at a reference receiver, a plurality of satellite signals from a plurality of satellite constellations and satellite navigation systems, the reference receiver being a portable ground-based receiver comprising a single antenna and located at an unidentified position;
forming satellite data from the satellite signals and identifying, using the satellite data, a position of a location of the reference receiver, and sending the position to a self-surveyor in a navigation information generator, the satellite data comprising: satellite clock correction coefficients data, satellite position data, carrier waves, ranging codes, and atmospheric error data;
the self-surveyor determining a level of accuracy for the location;
indicating to a user interface when the level of accuracy of the location of the reference receiver does not meet a desired level of accuracy for the location of the reference receiver;
generating, responsive to determining in the navigation information generator that the level of accuracy for the location comprises the desired level of accuracy for the location, messages using navigation information in satellite data in the plurality of satellite signals, messages comprising: a format specified by a message definition from a configuration database accessible by a user interface, and a pseudo-range correction data comprising a level of accuracy of the pseudo-range correction data that meets a desired level of accuracy for the pseudo-range correction data based upon a group of rules for the level of accuracy of the location; and
transmitting the pseudo-range correction data to a receiver in the aircraft for adjusting, using the pseudo-range correction data, an identified position of the receiver in the aircraft.

6. The method of claim 5, further comprising:
a man portable case comprising the reference receiver;
the messages comprising: a format specified by a message definition from a configuration database accessible by a user interface; and
transmitting the messages to the receiver in the aircraft over a transmitter system located in a second man portable case.

7. The method of claim 5, further comprising:
a first level of accuracy for a first group of locations for a group of reference receivers comprising the location of the reference receiver, the satellite data comprising first satellite data formed from the satellite signals
identifying a second level of accuracy for the group of reference receivers based on second satellite data, formed from second satellite signals, from the group of reference receivers, responsive to a portion of the group of reference receivers being at least one of: re-powered, re-configured, and moved to a second group of locations that differs from the first group of locations.

8. An apparatus that comprises:
a reference receiver, such that a man-portable case comprises the reference receiver and a single antenna in a location that comprises an unidentified position, the reference receiver configured to:
receive, from a Global Positioning Satellite System, a Global Navigation Satellite System, and additional satellite navigation systems, satellite signals; and
identify raw pseudo-range data and a group of satellite data parameters from the satellite signals, such that the satellite data parameters comprise: satellite clock correction coefficients data, satellite position data, carrier waves, ranging codes, and atmospheric error data, and the raw pseudo-range data and the group of satellite data parameters form satellite data; and
determine, based upon the satellite signals, a position of the location of the reference receiver;
a transmitter system that transmits messages to an aircraft; and
a navigation information generator that comprises a satellite data processor configured to:
receive the position of the location and the satellite data from the reference receiver;
generate the messages, such that the messages comprise navigation information that comprises:
the satellite data;
a pseudo-range correction data, based upon a determination by a self-surveyor that a level of accuracy of the pseudo-range correction data comprises a desired level of accuracy for the pseudo-range correction data, based upon a group of rules for a level of accuracy for a group of locations for a group of reference receivers, that comprise the location of the reference receiver, and a level of accuracy for the group of locations that comprises a desired level of accuracy for the group of locations; and
configuration data; and
send the messages to the aircraft over the transmitter system;
an operation application configured to control: operation of the group of reference receivers, the transmitter system, and the navigation information generator; and
a configuration application configured to receive inputs from a user interface.

9. The apparatus of claim 8, wherein the satellite data processor generates pseudo-range corrections using the satellite data to form the navigation information.

10. The apparatus of claim 8,
further comprising the self-surveyor configured to perform a self-survey based upon satellite data.

11. apparatus of claim 10, further comprising the self-survey configured to identify positions for the group of locations where the group of reference receivers were placed and indicate to a user interface whether the group of reference receivers provides a desired level of accuracy at the group of locations.

12. The apparatus of claim 8, wherein the configuration data includes values for the messages.

13. The apparatus of claim 8, wherein the group of reference receivers receive more than one frequency per satellite.

14. The apparatus of claim 8, wherein the group of reference receivers is configured to receive the satellite signals from additional constellations of satellites.

15. The apparatus of claim 8 further comprising:
a configuration database, wherein the configuration data is located in the configuration database and the configuration database is located in the navigation information generator.

16. The apparatus of claim 8, wherein the configuration application is a first configuration application and further comprising:
a computer system; and
a second configuration application on the computer system that receives from the user interface a request to access the configuration data used by the navigation information generator to generate the messages.

17. The apparatus of claim 8, wherein the configuration application displays a graphical user interface and receives inputs through the graphical user interface.

18. The apparatus of claim 8 further comprising:
a power supply connected to the group of reference receivers, the transmitter system, and the navigation information generator.

19. The apparatus of claim 8 further comprising:
a group of cases that are man portable, and that hold the group of reference receivers, the transmitter system, and the navigation information generator.

20. The apparatus of claim 8, wherein a first reference receiver in the group of reference receivers is placed at a new location that has not been surveyed prior to the first reference receiver being placed at the new location.

21. The apparatus of claim 8, wherein the navigation information includes at least one of take off information, landing information, approach information, or missed approach information.

\* \* \* \* \*